(12) United States Patent
Masuda et al.

(10) Patent No.: US 9,199,778 B2
(45) Date of Patent: Dec. 1, 2015

(54) OXYGEN ABSORBING RESIN COMPOSITION, OXYGEN ABSORBING MULTILAYERED BODY, AND OXYGEN ABSORBING HOLLOW CONTAINER

(71) Applicant: MITSUBISHI GAS CHEMICAL COMPANY, INC., Tokyo (JP)

(72) Inventors: Akihiro Masuda, Tokyo (JP); Kiyonori Michiba, Tokyo (JP); Yoshiki Itou, Tokyo (JP); Kenichi Niimi, Tokyo (JP); Tatsuo Iwai, Tokyo (JP); Takashi Kubo, Tokyo (JP)

(73) Assignee: MITSUBISHI GAS CHEMICAL COMPANY, INC., Tokyo (JP)

( * ) Notice: Subject to any disclaimer, the term of this patent is extended or adjusted under 35 U.S.C. 154(b) by 0 days.

(21) Appl. No.: 14/236,452

(22) PCT Filed: Nov. 14, 2012

(86) PCT No.: PCT/JP2012/079544
§ 371 (c)(1),
(2) Date: Jan. 31, 2014

(87) PCT Pub. No.: WO2013/073590
PCT Pub. Date: May 23, 2013

(65) Prior Publication Data
US 2014/0291178 A1    Oct. 2, 2014

(30) Foreign Application Priority Data

| Nov. 15, 2011 | (JP) | ................................. 2011-249459 |
| Dec. 22, 2011 | (JP) | ................................. 2011-281885 |
| Dec. 27, 2011 | (JP) | ................................. 2011-286138 |
| Nov. 9, 2012  | (JP) | ................................. 2012-247116 |

(51) Int. Cl.
*B32B 1/02* (2006.01)
*B65D 81/26* (2006.01)
(Continued)

(52) U.S. Cl.
CPC .............. *B65D 81/266* (2013.01); *B32B 27/08* (2013.01); *B32B 27/18* (2013.01); *B32B 27/304* (2013.01);
(Continued)

(58) Field of Classification Search
CPC ....... C08K 3/00; B32B 1/02; Y10T 428/1352
USPC ...................... 428/34.1, 34.2, 35.7, 35.9, 36.9
See application file for complete search history.

(56) References Cited

U.S. PATENT DOCUMENTS 4,756,436 A * 7/1988 Morita et al. .................. 215/228
5,026,594 A * 6/1991 Akao ............................ 428/220
(Continued)

FOREIGN PATENT DOCUMENTS

CN      1332034      1/2002
EP      0761348      3/1997
(Continued)

OTHER PUBLICATIONS

International Search Report issued Jan. 15, 2013 in PCT/JP2012/079544.
(Continued)

*Primary Examiner* — Marc Patterson
(74) *Attorney, Agent, or Firm* — Greenblum & Bernstein, P.L.C.

(57) ABSTRACT

There are provided an oxygen absorbing resin composition, an oxygen absorbing multilayered body, and an oxygen absorbing hollow container that can absorb oxygen in an atmosphere even under a low-humidity atmosphere. The oxygen absorbing resin composition includes: (I) an oxygen absorbing agent consisting of a metal (a metal of (I)) obtained by subjecting an alloy comprising (A) at least one transition metal selected from the group consisting of manganese, iron, platinum, and copper group metals and (B) at least one metal selected from the group consisting of aluminum, zinc, tin, lead, magnesium, and silicon, to treatment with an acidic or alkaline aqueous solution to elute and remove at least a part of the component (B); and (II) a thermoplastic resin.

32 Claims, 5 Drawing Sheets

(51) Int. Cl.

| | | |
|---|---|---|
| *C08J 5/18* | (2006.01) | |
| *C08K 9/00* | (2006.01) | |
| *C08L 101/00* | (2006.01) | |
| *C08K 3/04* | (2006.01) | |
| *B65D 1/02* | (2006.01) | |
| *B32B 27/08* | (2006.01) | |
| *C08K 3/08* | (2006.01) | |
| *C08K 7/24* | (2006.01) | |
| *B32B 27/18* | (2006.01) | |
| *B32B 27/30* | (2006.01) | |
| *B32B 27/32* | (2006.01) | |
| *B32B 27/34* | (2006.01) | |
| *B32B 27/36* | (2006.01) | |
| *B32B 1/08* | (2006.01) | |

(52) U.S. Cl.
CPC ............... *B32B 27/306* (2013.01); *B32B 27/32* (2013.01); *B32B 27/34* (2013.01); *B32B 27/36* (2013.01); *B65D 1/0215* (2013.01); *B65D 81/267* (2013.01); *C08J 5/18* (2013.01); *C08K 3/04* (2013.01); *C08K 3/08* (2013.01); *C08K 7/24* (2013.01); *C08K 9/00* (2013.01); *C08L 101/00* (2013.01); *B32B 2307/7242* (2013.01); *B32B 2307/74* (2013.01); *B32B 2439/60* (2013.01); *B32B 2439/70* (2013.01); *B32B 2439/80* (2013.01); *C08K 2003/0856* (2013.01); *C08K 2003/0862* (2013.01)

(56) References Cited

U.S. PATENT DOCUMENTS

| 5,089,323 | A | 2/1992 | Nakae et al. | |
|---|---|---|---|---|
| 2002/0086929 | A1 | 7/2002 | Chiang et al. | |
| 2003/0040564 | A1* | 2/2003 | Tung et al. | 524/434 |
| 2004/0185198 | A1 | 9/2004 | Sisson et al. | |
| 2007/0100050 | A1 | 5/2007 | Leckonby et al. | |
| 2009/0126573 | A1 | 5/2009 | Kinoshita | |
| 2009/0158890 | A1 | 6/2009 | Garbar et al. | |
| 2009/0169586 | A1 | 7/2009 | Tracton | |
| 2010/0068379 | A1* | 3/2010 | Rollick | 427/216 |
| 2011/0017611 | A1 | 1/2011 | Menozzi et al. | |
| 2013/0209350 | A1 | 8/2013 | Ishihara et al. | |
| 2014/0291178 | A1 | 10/2014 | Masuda et al. | |

FOREIGN PATENT DOCUMENTS

| JP | 54-99092 | 8/1979 |
|---|---|---|
| JP | 56-2845 | 1/1981 |
| JP | 62-1824 | 1/1987 |
| JP | 62-277148 | 12/1987 |
| JP | 8-238081 | 9/1996 |
| JP | 9-253481 | 9/1997 |
| JP | 11-240095 | 9/1999 |
| JP | 2002-320662 | 11/2002 |
| JP | 3496427 | 11/2003 |
| JP | 2004-201640 | 7/2004 |
| JP | 2005-104064 | 4/2005 |
| JP | 2007-038523 | 2/2007 |
| JP | 2007-185653 | 7/2007 |
| JP | 4001614 | 8/2007 |
| JP | 2008-55320 | 3/2008 |
| JP | 4248986 | 1/2009 |
| JP | 4501044 | 4/2010 |
| WO | 2010/147097 | 12/2010 |
| WO | 2012/105457 | 8/2012 |

OTHER PUBLICATIONS

International Preliminary Report on Patentability for PCT/JP2012/079544, mailed May 30, 2014.

U.S. Office Action in respect to U.S. Appl. No. 13/814,313, mailed Oct. 15, 2014.

European Search Report in respect to European Application No. 12850570.8, dated Apr. 23, 2015.

* cited by examiner

OXYGEN ABSORBING RESIN COMPOSITION, OXYGEN ABSORBING MULTILAYERED BODY, AND OXYGEN ABSORBING HOLLOW CONTAINER

TECHNICAL FIELD

The present invention relates to an oxygen absorbing resin composition comprising an oxygen absorbing agent consisting of an oxygen absorbing metal and a thermoplastic resin. More specifically, the present invention relates to an oxygen absorbing resin composition that can absorb and remove oxygen even in a low-humidity atmosphere. The present invention also relates to an oxygen absorbing multilayered body and an oxygen absorbing hollow container produced using the oxygen absorbing resin composition.

BACKGROUND ART

One of techniques for preserving foods, pharmaceutical products and the like is preservation utilizing oxygen absorbing agents (oxygen scavengers). Specifically, the preservation utilizing oxygen absorbing agents is a technique in which an oxygen scavenger capable of absorbing oxygen in atmosphere, together with an object, is placed within a hermetically sealable packaging body, and the inside of the hermetically sealable packaging body is brought to an oxygen-free state to prevent an oxidation-derived deterioration, a fungal deterioration, discoloration and the like of objects.

Oxygen scavengers formed of various inorganic materials and oxygen scavengers formed of various organic materials have hitherto been proposed for the removal of oxygen in atmosphere. Examples thereof include oxygen scavengers comprising inorganic main agents, for example, iron or other metal powders, sulfites, bisulfites, and dithionite, and oxygen scavengers comprising organic main agents, for example, L-ascorbic acid, erythorbic acid and salts thereof, saccharides such as glucose, and reducing polyhydric alcohols such as cathecol and pyrogallol.

These conventional oxygen scavengers, however, suffer from a problem that, in use, when a material that can supply water or moisture does not exist, an oxygen scavenging capability high enough to be used for practical use cannot be provided. Specifically, in conventional oxygen scavengers, an oxygen scavenging capability high enough to be used for practical use cannot be provided without mixing of the material with water or moisture retained thereon, for example, compounds containing water of crystallization, in use, or utilization of water vapor released from foods or the like to be preserved. Accordingly, difficulties have been encountered in applying conventional oxygen scavengers to pharmaceutical products or dried foods that should be used or preserved under drying conditions, or to storage of metal products that are weak against water or moisture without rusting.

Accordingly, oxygen absorbing agents that do not require moisture in oxygen absorption have been demanded in these applications. Oxygen absorbing agents reported as meeting this demand include, for example, (a) oxygen scavengers comprising cerium oxide utilizing oxygen defects as a main agent (Japanese Patent No. 4001614 (Patent Document 1)), (b) oxygen scavengers comprising titanium oxide containing oxygen defects as a main agent (Japanese Patent No. 4248986 (Patent Document 2)), (c) oxygen scavengers comprising a metal subjected to hydrogen reduction as a main agent (Japanese Patent Application Laid-Open No. 277148/1987 (Patent Document 3), and (d) oxygen scavengers that utilize autoxidation of organic substances.

Among the above oxygen scavengers, oxygen scavengers disclosed in the above (a) and (b) utilize rare metals as starting materials that are rare and expensive. Further, the rare metals should be obtained through import from foreign countries, and, thus, depending upon further situation development, there is a possibility that the purchase of stock is varied, making it impossible to provide stable amount of production. Accordingly, these oxygen scavengers are not always satisfactory from the viewpoints of cost and stable supply of the rare metals. The oxygen scavenger disclosed in the above (c) requires the provision of a large hydrogen reduction equipment in the production thereof and thus cannot be simply produced and, at the same time, cannot be said to have good handleability in the atmosphere. Furthermore, the oxygen scavenger in the above (d) utilizes an oxidation reaction of the organic substance as the main agent, posing a problem of a by-product produced after oxygen absorption.

Accordingly, there is still a demand for an oxygen absorbing resin composition that can absorb oxygen in the atmosphere even in a moisture-free or substantially moisture-free atmosphere, is advantageous in stable availability of starting materials at relatively low cost, is substantially free from the problem of the by-product, and is not necessary to provide a large apparatus for hydrogen reduction as an incidental equipment.

Techniques have recently been adopted in which objects to be stored are packaged with sheet-shaped packaging materials obtained by kneading an oxygen scavenger with a resin and forming the kneaded product into a sheet or film (for example, Japanese Patent No. 3496427 (Patent document 4) and International Publication WO 2010/147097 (Patent document 5)). Further, the use of sheet-shaped packaging materials has also been desired for storage of pharmaceutical products or dried foods that should be used or stored under dried conditions, and rust preventive storage of metal products in which the presence of water or moisture is not favorable. Specifically, sheet- or film-shaped oxygen absorbing packaging materials have also been desired to have a capability of absorbing oxygen in an atmosphere, even under a moisture-free or substantially moisture-free atmosphere.

Various techniques have been proposed for storing foods and pharmaceutical products. Hollow containers composed mainly of polyesters such as polyethylene terephthalate (PET) having a high gas barrier capability are used, for example, in teas, fruit beverages, and carbonated beverage. Further, hollow containers produced using gas barrier resins exemplified by polymethaxyleneadipamide resins (hereinafter referred to also as "MXD6 resin") and ethylene-vinyl alcohol copolymer resins (hereinafter referred to also as "EVOH resin") are extensively utilized for storage of foods and pharmaceutical products.

Hollow containers of polyester resins used particularly in beverages having a rapidly grown demand have a tendency toward a size reduction from the viewpoint of portable convenience, and various hollow containers having an inner volume of less than 500 mL are used for various contents such as green teas, sports drinks, carbonated beverages, teas, fruit beverages, coffees, and vegetable beverages, and most of these contents are likely to be adversely affected and deteriorated by light or oxygen.

Regarding applications other than beverages, there is an increasing tendency toward the adoption of hollow containers of polyolefinic resins having a small inner volume of about 100 mL in tablet gums, cosmetics, functional supplements, and tablet-type pharmaceutical products. In hollow containers, the proportion of the surface area per unit volume increases with a reduction in size. Accordingly, the quality of contents is deteriorated at a higher speed, and the quality guarantee period is likely to be shortened.

For this reason, various techniques have been proposed and implemented for extending the best-before date of the contents in hollow containers. Japanese Patent Application Laid-Open No. 320662/2002 (Patent document 6) describes, as one example of fundamental techniques for extending the best-before date of the contents of hollow containers, a technique in which a hermetically sealable container having a good oxygen permeability is used in combination with a small bag-shaped oxygen scavenger to suppress an oxidative deterioration of easily oxidizable drugs. This invention, however, has problems to be solved, for example, that, when contents of the hollow container are liquid, a small bag-shaped oxygen scavenger cannot be sealed in the hollow container; a machine for sealing of the oxygen scavenger should be installed; the number of process steps in the production is increased; and the amount of wastes after use is large.

Japanese Patent Publication No. 1824/1987 (Patent document 7) describes, as another example of fundamental techniques for extending the best-before date, a technique on oxygen scavenging multilayered structures such as bags and bottle tubes that include an oxygen absorbing layer formed of a material obtained by incorporating an oxygen scavenger composed mainly of a reducing iron in an oxygen permeable resin. The method proposed in this invention, however, is not simple because a large-scale hydrogen reduction equipment should be provided in combination with iron oxide as a starting material. Further, water is necessary for the oxidation reaction, and contents that can be stored in the multilayered structure are disadvantageously limited to aqueous materials.

For example, Japanese Patent No. 4501044 (Patent document 8) describes, as a further example of fundamental techniques for extending the best-before date, a technique that an oxidizable polyamide resin and a transition metal catalyst are used to impart a high level of barrier capability through absorption of oxygen being permeated from the outside of the hollow container into the inside of the hollow container with the elapse of time and, at the same time, to absorb oxygen dissolved in a liquid contained in the hollow container through the inner wall of the container, thereby suppressing and reducing an oxidation-derived deterioration of the contents. The claimed advantage of this invention is that the hollow container is suitable for use in applications where beers and teas are placed in hollow containers. This invention, however, is disadvantageous in that, due to the utilization of an oxidation reaction of an organic material, by-products derived from the oxidation reaction are produced and an oxidation reaction-derived lowering in strength of the hollow container occurs.

PRIOR ART DOCUMENTS

Patent Documents

[Patent Document 1] Japanese Patent No. 4001614
[Patent Document 2] Japanese Patent No. 4248986
[Patent Document 3] Japanese Patent Application Laid-Open No. 277148/1987
[Patent Document 4] Japanese Patent No. 3496427
[Patent Document 5] International Publication WO2010/147097
[Patent Document 6] Japanese Patent Application Laid-Open No. 320662/2002
[Patent Document 7] Japanese Patent Publication No. 1824/1987
[Patent Document 8] Japanese Patent No. 4501044

SUMMARY OF THE INVENTION

Problems to be Solved by the Invention

The present inventors have found that a metal obtained by removing only aluminum from an alloy composed of aluminum and iron or an alloy composed of aluminum and nickel using an aqueous sodium hydroxide solution can absorb and remove oxygen in an atmosphere, even in a moisture-free or substantially moisture-free atmosphere having a humidity of not more than 30% RH (25° C.), on the same level as conventional oxygen scavengers. As a result of further studies, it has been found that an alloy including a specific type of transition metals (falling within the component (A)) and one metal (falling within the component (B)) selected from the group consisting of aluminum, zinc, tin, lead, magnesium, and silicon can be used as the alloy and that an oxygen absorbing agent consisting of a intended metal can be obtained by adopting treatment with an acidic or alkaline aqueous solution to elute (leach) and remove at least a part of the component (B). An oxygen absorbing resin composition could have been obtained by kneading the oxygen absorbing agent with a thermoplastic resin. Further, the present inventors have succeeded in obtaining an oxygen absorbing multilayered body and an oxygen absorbing hollow container that can absorb oxygen even under a low-humidity atmosphere by using the oxygen absorbing resin composition. The present invention has been made based on these findings.

Accordingly, an object of the present invention is to provide an oxygen absorbing resin composition that can absorb oxygen in an atmosphere, even in a moisture-free or substantially moisture-free atmosphere, is advantageous in stable availability of starting materials at low cost, is substantially free from the problem of the by-product, and is not necessary to provide a large apparatus for hydrogen reduction as an incidental equipment. Another aspect of the present invention is to provide an oxygen absorbing multilayered body and an oxygen absorbing hollow container using the oxygen absorbing resin composition.

Means for Solving the Problems

According to the present invention, there are provided the following inventions (1) to (33).
(1) An oxygen absorbing resin composition comprising:
  (I) an oxygen absorbing agent consisting of a metal (a metal of (I)) obtained by subjecting an alloy comprising
    (A) at least one transition metal selected from the group consisting of manganese, iron, platinum, and copper group metals and
    (B) at least one metal selected from the group consisting of aluminum, zinc, tin, lead, magnesium, and silicon
  to treatment with an acidic or alkaline aqueous solution to elute and remove at least a part of the component (B); and
  (II) a thermoplastic resin.
(2) The oxygen absorbing resin composition according to (1), which can absorb oxygen even in an atmosphere having a low humidity of 30% RH or less at 25° C.
(3) The oxygen absorbing resin composition according to (1) or (2), which has a capability of absorbing at least 5 mL of oxygen per g in an atmosphere having a low humidity of 30% RH or less at 25° C.
(4) The oxygen absorbing resin composition according to any one of (1) to (3), wherein the metal of (I) is porous.

(5) The oxygen absorbing resin composition according to any one of (1) to (4), wherein the component (A) is at least one transition metal selected from the group consisting of iron, cobalt, nickel, and copper.
(6) The oxygen absorbing resin composition according to any one of (1) to (5), wherein the component (B) is aluminum.
(7) The oxygen absorbing resin composition according to any one of (1) to (6), wherein the content of the component (B) in the metal of (I) is 0.1 to 50% by weight.
(8) The oxygen absorbing resin composition according to any one of (1) to (7), wherein the specific surface area, as measured by a BET method, of the metal of (I) is at least 10 $m^2/g$.
(9) The oxygen absorbing resin composition according to any one of (1) to (8), wherein the alloy is powdery and the metal of (I) is powdery.
(10) The oxygen absorbing resin composition according to any one of (1) to (9), wherein an aqueous sodium hydroxide solution is used in the treatment with the aqueous solution.
(11) The oxygen absorbing resin composition according to any one of (1) to (10), wherein the thermoplastic resin of (II) is at least one resin selected from the group consisting of polyolefin resins, polyester resins, polyamide resins, polyvinyl alcohol resins, ethylene-vinyl alcohol copolymers, and chlorine-based resins.
(12) An oxygen absorbing packaging body comprising: an oxygen absorbing resin composition according to any one of (1) to (11); and a packaging material, the whole or a part of which is formed of an air-permeable packaging material, the oxygen absorbing resin composition having been packaged into the packaging material.
(13) An oxygen absorbing multilayered body comprising:
an oxygen absorbing layer (layer a) formed of an oxygen absorbing resin composition according to any one of (1) to (11); and
a thermoplastic resin layer (layer b) formed of a thermoplastic resin-containing thermoplastic resin composition, the thermoplastic resin layer (layer b) being provided on one side or both sides of the oxygen absorbing layer (layer a).
(14) The oxygen absorbing multilayered body according to (13), which further comprises a gas barrier layer (layer c).
(15) The oxygen absorbing multilayered body according to (13) or (14), which further comprises an adhesive layer (d) provided between the oxygen absorbinag layer (layer a) and the thermoplastic resin layer (layer b).
(16) The oxygen absorbing multilayered body according to (14), which further comprises an adhesive layer (d) between the oxygen absorbing layer (layer a) and the gas barrier layer (layer c) and/or between the thermoplastic resin layer (layer b) and the gas barrier layer (layer c).
(17) The oxygen absorbing multilayered body according to any one of (13) to (16), wherein the thermoplastic resin used in the thermoplastic resin layer (layer b) is at least one resin selected from the group consisting of polyolefin resins, polyester resins, polyamide resins, polyvinyl alcohol resins, ethylene-vinyl alcohol copolymer resins, and chlorine-based resins.
(18) The oxygen absorbing multilayered body according to any one of (13) to (17), wherein the oxygen absorbing multilayered body is at least one member selected from the group consisting of pellets, films, sheets, trays, cups, PTP containers, bottles, tubes, blocks, and caps.
(19) A preform for an oxygen absorbing package container, the preform comprising an oxygen absorbing multilayered body according to any one of (13) to (17).
(20) An oxygen absorbing package container comprising: a package container; and an oxygen absorbing multilayered body according to any one of (13) to (18) that is used in at least a part of the package container.
(21) An oxygen absorbing hollow container comprising an oxygen absorbing layer (layer a) formed of an oxygen absorbing resin composition according to any one of (1) to (11).
(22) The oxygen absorbing hollow container according to (21), wherein at least one layer in the oxygen absorbing hollow container further comprises a light shielding material.
(23) The oxygen absorbing hollow container according to (22), wherein the light shielding material contains at least one material selected from the group consisting of carbon black, titanium black, and titanium oxide.
(24) The oxygen absorbing hollow container according to any one of (21) to (23), wherein at least one of the innermost layer and the outermost layer in the oxygen absorbing hollow container is a thermoplastic resin layer (layer b) formed of a thermoplastic resin-containing thermoplastic resin composition.
(25) The oxygen absorbing hollow container according to any one of (21) to (24), which further comprises a gas barrier layer (layer c).
(26) The oxygen absorbing hollow container according to (25), wherein the thermoplastic resin layer (layer b), the gas barrier layer (layer c), the oxygen absorbing layer (layer a), and the thermoplastic resin layer (layer b) are provided in that order as viewed from the outer surface toward the inner surface.
(27) The oxygen absorbing hollow container according to any one of (21) to (26), which further comprises an adhesive layer (layer d).
(28) The oxygen absorbing hollow container according to (27), wherein the thermoplastic resin layer (layer b), the adhesive layer (layer d), the gas barrier layer (layer c), the adhesive layer (layer d), the oxygen absorbing layer (layer a), and the thermoplastic resin layer (layer b) are provided in that order as viewed from the outer surface toward the inner surface.
(29) The oxygen absorbing hollow container according to any one of (24) to (28), wherein the thermoplastic resin layer (layer b) provided on an outer side of the oxygen absorbing layer (layer a) contains a white pigment.
(30) The oxygen absorbing hollow container according to any one of (24) to (29), wherein the thermoplastic resin used in the thermoplastic resin layer (layer b) is at least one resin selected from the group consisting of polyolefin resins, polyester resins, polyamide resins, polyvinyl alcohol resins, ethylene-vinyl alcohol copolymer resins, and chlorine-based resins.
(31) The oxygen absorbing hollow container according to any one of (21) to (30), wherein the innermost layer in the oxygen absorbing hollow container has a thickness of not more than 200 μm.
(32) The oxygen absorbing hollow container according to any one of (21) to (31), wherein at least one layer in the oxygen absorbing hollow container contains a desiccant.
(33) A method for storing commodities, the method comprising storing a storing object using an oxygen absorbing multilayered body according to any one of (13) to (18), an oxygen absorbing package container according to (20), or an oxygen absorbing hollow container according to any one of (21) to (32).

Effect of the Invention

The oxygen absorbing resin composition according to the present invention can absorb and remove oxygen in an atmosphere, even in a moisture-free or substantially moisture-free atmosphere, on the same level as conventional oxygen scavenger-containing oxygen absorbing resin compositions and thus is also suitable for use in applications where conventional oxygen scavengers cannot be applied, for example, where the atmosphere of the inside of packages of dried foods, pharmaceutical products, and electronic materials weak against moisture is brought to an oxygen-free state. Further, the oxygen absorbing multilayered body and the oxygen absorbing hollow container according to the present invention can absorb and remove oxygen in an atmosphere, even in a moisture-free or substantially moisture-free atmosphere, on the same level as conventional oxygen scavenger-containing oxygen absorbing resin compositions by using the oxygen absorbing resin composition.

MODE FOR CARRYING OUT THE INVENTION

Oxygen Absorbing Resin Composition

Figure 1:
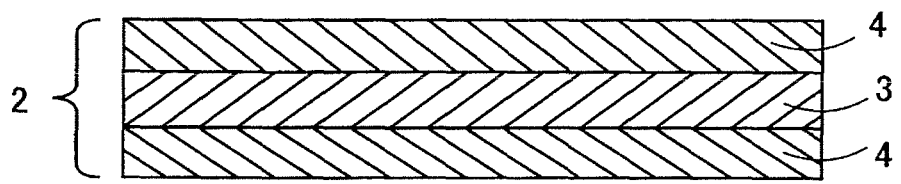
FIG. 1 is a schematic cross-sectional view of one example of an oxygen absorbing multilayered body according to the present invention.

The oxygen absorbing resin composition according to the present invention includes (I) an oxygen absorbing agent and (II) a thermoplastic resin. The expression "oxygen absorbing" used herein refers to a capability of selectively absorbing oxygen from an atmosphere around a place where the resin composition has been installed.

Oxygen Absorbing Agent

The oxygen absorbing agent used in the present invention is consisting of a metal that has been obtained by subjecting an alloy comprising, two components, that is, (A) at least one transition metal selected from the group consisting of manganese, iron, platinum, and copper group metals and (B) at least one metal selected from the group consisting of amphoteric metals, magnesium, and silicon, to treatment with an acidic or alkaline aqueous solution to elute and remove at least a part of the component (B). The term "oxygen absorbing agent" used herein refers to an agent that can selectively absorb oxygen from an atmosphere around a place where the agent has been installed.

Metal of (I)

As described above, the "metal of (I)" contained in the oxygen absorbing resin composition according to the present invention is a metal obtained by subjecting an alloy comprising (A) at least one transition metal selected from the group consisting of manganese, iron, platinum, and copper group metals and (B) at least one metal selected from the group consisting of aluminum, zinc, tin, lead, magnesium, and silicon, to treatment with an acidic or alkaline aqueous solution to elute and remove at least a part of the component (B).

Component (A)

The transition metal usable as the component (A) constituting the oxygen absorbing agent is at least one transition metal selected from manganese group metals (manganese, technetium, and rhenium), iron group metals (iron, cobalt, and nickel), platinum group metals (ruthenium, rhodium, palladium, osmium, iridium, and platinum), and copper group metals (copper, silver, and gold). The transition metals may also be used in a combination of two or more of them. For example, when iron and nickel are selected, an Fe—Ni alloy may be used as the component (A).

The component (A) is preferably manganese, iron, cobalt, nickel, or copper, more preferably iron, cobalt, nickel, or copper, still more preferably iron or nickel, particularly preferably iron. Among them, iron is preferred because of high safety and low cost.

Component (B)

The component (B) constituting the oxygen absorbing agent is at least one metal selected from aluminum, zinc, tin, lead, magnesium, and silicon. The component (B) is preferably at least one metal selected from aluminum, zinc, magnesium, or silicon, more preferably aluminum, zinc, magnesium, or silicon, still more preferably aluminum. Among them, aluminum is preferred because of low cost.

Component (C)

In the present invention, an alloy comprising the component (A) and the component (B) is prepared. Molybdenum, chromium, titanium, vanadium, tungsten and the like may be further added as additive metals to the alloy. The alloy may further comprise additive components such as cyanic acids.

In the present invention, the alloy comprising the component (A) and the component (B) is prepared by a melting method. The component ratio between the component (A) and the component (B) in the alloy (component (A):component (B)) is preferably 20:80 to 80:20, more preferably 30:70 to 70:30. More specifically, for example, when the component (A) and the component (B) are iron or nickel and aluminum, respectively, preferably, the proportion of iron or nickel and the proportion of aluminum are 30 to 55% by weight and 45 to 70% by weight, respectively, based on 100 parts by weight in total of the component (A) and the component (B).

The alloy as such may be subjected to treatment with an acidic or alkaline aqueous solution. In general, the alloy is finely ground before the treatment with the acidic or alkaline aqueous solution. The term "alloy" used herein refers to an alloy having a single composition that has a specific crystal structure, as well as an alloy mixture or a mixture of metals per se.

The alloy may be finely ground by a method properly selected from commonly used metal crushing/grinding methods. An example of the finely grinding method is one in which the alloy is ground by a jaw crusher, a roll crusher, a hammer mill or the like, and, if necessary, fine grinding with a ball mill is further performed. Alternatively, a method may also be adopted in which a molten metal of the alloy is finely ground by rapid solidification such as atomization. When atomization is adopted, fine grinding in an inert gas such as an argon gas is preferred. The atomization may be performed by a method described, for example, in Japanese Patent Application Laid-Open No. 23597/1993.

The particle diameter of the alloy powder is preferably in the range of 5 to 200 μm. The particle size distribution is preferably as narrow as possible. Sieving (classification) with commercially available mesh sieves (for example, 200-mesh sieves) may be properly performed from the viewpoints of removing particles having a large diameter and providing uniform particle size distribution. The atomization is likely to provide near spherical powder particles and, at the same time, to provide a narrow particle size distribution.

In the present invention, the alloy or alloy powder thus obtained is treated with an acidic or alkaline aqueous solution to elute and remove at least a part of the component (B) from the alloy. That is, in the present invention, a metal obtained by eluting and removing at least a part of the component (B) from the alloy is used. Any acidic or alkaline aqueous solution that does not dissolve or hardly dissolves the component (A), but on the other hand, can dissolve and remove the component (B), that is, can leach the component (B) from the alloy, can be used without particular limitation. Examples of acids usable in the acidic aqueous solution include hydrochloric acid, sulfuric acid, and nitric acid. Examples of alkalis usable in the alkaline aqueous solution include sodium hydroxide, potassium hydroxide, $Na_2CO_3$, $K_2CO_3$, and ammonia. In the acidic or alkaline aqueous solution, a combination of two or more of the acids or a combination of two or more of the alkalis may if necessary be used.

In a preferred embodiment of the present invention, the acidic or alkaline aqueous solution is preferably an alkaline aqueous solution, more preferably an aqueous solution of sodium hydroxide. For example, when aluminum is used as the component (B), the use of an aqueous sodium hydroxide solution as the alkaline aqueous solution is advantageous in that the removal of excess sodium hydroxide by water washing and the removal of eluted aluminum are easy and, thus, the effect of reducing the necessary times of water washing can be expected to be exerted.

In the treatment with the acidic or alkaline aqueous solution, for alloy powder, it is common practice to introduce the alloy powder little by little into an acidic or alkaline aqueous solution with stirring. Alternatively, a method may be adopted in which the alloy powder is previously placed in water and a concentrated acid or alkali is added dropwise to the water containing the alloy powder.

In the treatment with the acidic or alkaline aqueous solution, the concentration of the acidic or alkaline aqueous solution used is, for example, 5 to 60% by weight. More specifically, when sodium hydroxide is used, the concentration is preferably 10 to 40% by weight.

In the treatment with the acidic or alkaline aqueous solution, the aqueous solution may be in use heated, for example, preferably approximately 20 to 120° C. Preferably, the temperature of the alkaline aqueous solution is 25 to 100° C.

The treatment time for the treatment of the alloy or alloy, powder with the acidic or alkaline aqueous solution may vary depending, for example, upon the shape, state, and amount of the alloy used, the concentration of the acidic or alkaline aqueous solution, and the temperature of the treatment but is generally approximately 30 to 300 min. The amount of the component (B) eluted from the alloy may be regulated by regulating the treatment time.

In the present invention, at least a part of the component (B) is eluted and removed from the alloy by the treatment with the acidic or the alkaline aqueous solution. Here eluting and removing "at least a part of the component (B)" means the elution and removal of a part of the component (B) from the alloy comprising the component (A) and the component (B), as well as the elution and removal of the whole component (B) from the alloy comprising the component (A) and the component (B). It cannot be denied that there is possibility that, in the process of elution, a part of the component (A) is dissolved in the acidic or alkaline aqueous solution. Accordingly, "at least a part of the component (B)" is not limited to the elution of only the component (B) by the treatment with the acidic or alkaline aqueous solution.

At least a part, preferably a large proportion, of the component (B) (for example, aluminum) is eluted from the alloy by the treatment with the acidic or alkaline aqueous solution. The proportion of the elution of the component (B) from the alloy can be expressed in terms of the content (on a weight basis) (residual ratio) of the component (B) in the metal obtained after the elution and removal.

The content of the component (B) in the metal of (I) used as the oxygen absorbing agent is preferably 0.1 to 50% by weight, more preferably 1 to 40% by weight. More specifically, for example, when the alloy is an Al—Fe alloy, the content of aluminum in the metal obtained by eluting and removing aluminum by the treatment with the acidic or alkaline aqueous solution is preferably 0.1 to 50% by weight, more preferably 1 to 40% by weight. The content of the component (B) (for example, aluminum) in the metal of (I) contained in the oxygen absorbing resin composition may be measured, for example, by an ICP method.

After the treatment for the removal by elution, washing with water is generally carried out. The metal or the metal powder thus obtained is disadvantageously immediately oxidized and deteriorated in the air and thus may if necessary be stored in water.

In obtaining the metal of (I) to be used as the oxygen absorbing agent, during and after the treatment of the alloy containing the component (A) and the component (B) with an acidic or alkaline aqueous solution, consideration should be made so that the contact of the metal and the alloy with oxygen is avoided or minimized. Accordingly, preferably, these series of treatment are carried out in an aqueous solution and water and the treated product as such is then stored in the aqueous solution and water, or alternatively, these series of treatment are carried out under oxygen-free conditions or under an inert gas. Further, in use, when the metal should be taken out from the water and dried, preferably, for example, the metal is dried under such conditions that influence by oxygen is minimized, for example, by vacuum drying, and this state is held.

The metal obtained as described above has a porous shape (or is in a porous body form). The porous shape refers to such a state that a number of pores having a size observable under an electron microscope are present on the surface or in the inside of the metal. In the present invention, the porosity in the porous shape of the metal can be expressed in terms of specific surface area. Specifically, the specific surface area of the metal used in the oxygen absorbing resin composition according to the present invention is at least 10 $m^2/g$, preferably at least 20 $m^2/g$, as measured by a BET method.

For example, in the present invention, when iron and aluminum are used as the component (A) and the component (B), respectively, the specific surface area (measured by the BET method) of the resultant porous metal is, for example, approximately 20 to 40 m$^2$/g, whereas a nonporous conventional iron powder (reduced iron powder or atomized iron powder) has a specific surface area of approximately 0.07 to 0.13 m$^2$/g, demonstrating that the former is porous.

The porosity in the porous shape of the metal may also be expressed in terms of bulk density. The bulk density of the metal of (I) used as the oxygen absorbing agent is not more than 2 g/cm$^3$, preferably not more than 1.5 g/cm$^3$. Incidentally, the nonporous conventional iron powder (reduced iron powder or atomized iron powder) has a bulk density of approximately 2 g/cm$^3$ (exclusive) to 3 g/cm$^3$ (inclusive).

In the present invention, when iron and aluminum are used as the component (A) and the component (B), respectively, the mean particle diameter of the resultant porous metal powder of (I) is generally 1 to 1,000 μm, preferably 10 to 500 μm. The "mean particle diameter" used herein refers to a value that is calculated from a particle size distribution obtained by measuring particle diameters by a laser diffraction method, for example, with a laser diffraction scattering particle size distribution measuring device (SK Laser Micron Sizer LMS-2000e, manufactured by Seishin Enterprise Co. Ltd.).

The porous metal of (I) used as the oxygen absorbing agent has a high level of oxygen absorption activity and thus can exert suitable properties as the oxygen absorbing agent even under a low-humidity atmosphere (for example, not more than 30% RH (relative humidity) (25° C.).

The oxygen absorbing agent contained in the oxygen absorbing resin composition according to the present invention can absorb oxygen even in an atmosphere having a low humidity of not more than 30% RH (25° C.). More specifically, in an atmosphere having a low humidity of not more than 30% RH (relative humidity) (25° C.), the metal of (I) used as the oxygen absorbing agent absorbs at least 5 mL, more preferably 10 mL, of oxygen per g. The amount of oxygen absorbed by the metal of (I) may be 5 to 150 mL/g in an atmosphere having a low humidity of not more than 30% RH (relative humidity) (25° C.).

In the oxygen absorbing resin composition according to the present invention, when the metal of (I) is mixed with the thermoplastic resin (II) which will be described later, preferably, the metal of (I) is added so that the content of the metal of (I) in the oxygen absorbing resin composition is 1 to 80% by weight, preferably 5 to 70% by weight, particularly preferably 10 to 65% by weight. When the content of the metal of (I) is not less than 1% by weight, a higher level of oxygen absorbing capability can be obtained. When the content of the metal of (I) is not more than 80% by weight, an increase in viscosity of the whole composition caused by an increase in the content of the metal can be suppressed and, thus, for example, good processability of the resin can be maintained.

(II) Thermoplastic Resin

As long as the effect of the present invention is not practically sacrificed, the thermoplastic resin (II) is not particularly limited and conventional publicly known thermoplastic resins may be used. Preferably, for example, the thermoplastic resin is at least one resin selected from the group consisting of polyolefin resins, polyester resins, polyamide resins, polyvinyl alcohol resins, ethylene-vinyl alcohol copolymer resins, and chlorine-based resins.

Conventional publicly known polyolefin resins may be used as the polyolefin resin. Examples thereof include various polyethylenes (PE) such as high-density polyethylenes, medium-density polyethylenes, low-density polyethylenes, linear low-density polyethylenes, ultralow-density polyethylenes, and polyethylenes produced in the presence of a metallocene catalyst; and polypropylenes such as polystyrenes, polymethylpentenes, propylene homopolymers, propylene-ethylene block copolymers, and propylene-ethylene random copolymers. They may be used solely or in a combination of two or more of them. Various polyethylenes such as high-density polyethylenes, medium-density polyethylenes, low-density polyethylenes, linear low-density polyethylenes, and polyethylenes produced in the presence of a metalocene catalyst, and various polypropylenes such as propylene-ethylene block copolymers and propylene-ethylene random copolymers are particularly preferred as the polyolefin resin from the viewpoints of oxygen absorbing capability and film formability. If necessary, ethylene-vinyl acetate copolymers, ethylene-methyl acrylate copolymers, ethylene-ethyl acrylate copolymers, ethylene-acrylic acid copolymers, ethylene-methacrylic acid copolymers, ethylene-methyl methacrylate copolymers, and thermoplastic elastomers may be added to these polyolefin resins.

Conventional publicly known polyester resins may be used as the polyester resin. Examples thereof include aromatic polyesters and aliphatic polyesters. Specific examples thereof include polyethylene terephthalate (PET).

Conventional publicly known polyamide resins may be used as the polyamide resin. Examples thereof include aromatic polyamides and aliphatic polyamides. Specific examples thereof include nylon 6, nylon 6,6, nylon 6,12, and polymethaxyleneadipamides (for example, MXnylon manufactured by Mitsubishi Gas Chemical Company, Inc.).

Conventional publicly known polyvinyl alcohol resins may be used as the polyvinyl alcohol resin. The polyvinyl alcohol resin is a resin obtained by saponifying a vinyl ester polymer or a copolymer of a vinyl ester with other monomer in the presence of an alkali catalyst. The degree of saponification of the vinyl ester component in the polyvinyl alcohol resin is suitably not less than 90%, more suitably not less than 95%, still more suitably not less than 99%. The polyvinyl alcohol resin may be a blend of two or more polyvinyl alcohol resins that are different from each other in degree of saponification.

Conventional publicly known ethylene-vinyl alcohol copolymer resins may be used as the ethylene-vinyl alcohol copolymer resin (EVOH). Ethylene-vinyl alcohol copolymer resins are resins obtained by saponifying ethylene-vinyl ester copolymers. Among them, ethylene-vinyl alcohol copolymers having an ethylene content of 5 to 60% by mole and a degree of saponification of not less than 85%. The lower limit of the ethylene content of the ethylene-vinyl alcohol copolymer resin is preferably 20% by mole, more preferably 25% by mole. The upper limit of the ethylene content is preferably 55% by mole, more preferably 50%. The upper limit of the vinyl ester component is preferably 85%, more preferably 90%, still more preferably 99%.

Conventional publicly known chlorine-based resins may be used as the chlorine-based resin. Examples thereof include block copolymers and graft copolymers composed mainly of polyvinyl chloride and polyvinylidene chloride (PVDC), and polymer blends composed mainly of vinyl chloride resins. Examples of comonomers to be copolymerized with vinyl chloride include vinyl acetate, vinylidene chloride, acrylic acid, methacrylic acid, and esters thereof, olefins such as acrylonitriles, ethylene, and propylene, and maleic acid and anhydrides thereof.

Among the thermoplastic resins, polyethylenes, polypropylenes, ethylene-vinyl acetate copolymers, elastomers, or mixtures thereof are preferred from the viewpoint of oxygen absorption.

The following materials may be incorporated in the thermoplastic resin as long as the effect of the present invention is not practically sacrificed: dispersants such as waxes and surfactants; coloring pigments such as titanium oxide; additives such as antioxidants, slip agents, antistatic agents, and stabilizers; fillers such as calcium carbonate, clay, mica, and silica; other optional components such as desiccants, unpleasant odor removing agents, phenol-based antioxidants, phosphorus-based antioxidants, lactone-based antioxidants, flame retardants, photostabilizers, ultraviolet absorbers, lubricants, deodorants, antistatic agents, antitack agents, anti-fogging agents, and surface treating agents. In particular, dispersants are preferred from the viewpoint of improving the dispersion of the oxygen absorbing agent. When recycling and reprocessing of left over materials that occur during the production are contemplated, preferably, antioxidants is added. Optional materials may be incorporated by any method without particular limitation but are generally incorporated by melt kneading with the resin.

Production and Use of Oxygen Absorbing Resin Composition

In the present invention, the oxygen absorbing resin composition can be prepared by mixing the oxygen absorbing agent (I) and the thermoplastic resin (II). Preferably, the metal of (I) is added so that the concentration of the metal of (I) in the oxygen absorbing resin composition is 1 to 80% by weight, preferably 5 to 70% by weight, particularly preferably 10 to 65% by weight. When the concentration of the metal is in the above-defined range, the oxygen absorbing capability is advantageously higher than that when the addition amount of the metal is below the lower limit of the above-defined addition amount range. When the concentration of the metal is in the above-defined range, an increase in viscosity of the whole composition caused by an increase in metal content can be suppressed and the resin processability and the like can be maintained better than that when the addition amount of the metal is above the upper limit of the above-defined range.

An example of the production of the oxygen absorbing resin composition according to the present invention will be described. Specifically, the oxygen absorbing resin composition according to the present invention can be produced, for example, by melt-kneading a master batch containing the metal of (I) and the thermoplastic resin (II), optionally molding the melt-kneaded product into a desired shape, and then performing cooling.

The oxygen absorbing resin composition according to the present invention may be used in any form without particular limitation, for example, films, sheets, pellets, powders, and various other forms. The shape of pellets and powders may also not be limited. Among others, preferably, the oxygen absorbing resin composition has a sheet, film, or powder shape because the surface area per unit weight is so large that the oxygen absorption speed can be advantageously improved. The thickness of the film is generally 10 μm (inclusive) to 250 μm (exclusive), and the thickness of the sheet is generally 250 μm (inclusive) to 3 mm (exclusive). The mean particle diameter of the powder is generally 1 to 1,000 μm, preferably 10 to 500 μm.

The oxygen absorbing resin composition according to the present invention may be in any form without particular limitation and may be used as the whole or a part of various package forms such as pouches, lids for containers, trays, cups, laminated tube containers, paper containers, bottles, and blister containers.

The oxygen absorbing resin composition according to the present invention may be formed into a desired shape by any method without particular limitation, and conventional publicly known methods may be adopted. Sheets or films can be formed, for example, by solution cast molding or by extrusion through a die having a predetermined shape such as a T-die or a circular die with a uniaxial or multiaxial melt extruder. It is a matter of course that compression molding, injection molding and the like may also be adopted. Powdery oxygen absorbing agents can be obtained, for example, by pulverizing the oxygen absorbing resin composition in an atmosphere having a temperature below Tg of the thermoplastic resin contained in the oxygen absorbing resin composition. Pellets can be obtained, for example, by pelletizing strands delivered from an extruder. In particular, fine pellets can be obtained by forming thin strands. Small bag-shaped or canister-shaped oxygen absorbing agents can be obtained by filling the resultant powders or pellets into small bags or canisters. Further, the oxygen absorbing resin composition may also be molded into desired shapes by blow molding, injection molding, vacuum molding, pressure molding, buldging moldig, plug-assist molding, and powder molding.

In a preferred embodiment of the present invention, the oxygen absorbing resin composition according to the present invention is in a sheet or film form. In another preferred embodiment of the present invention, the oxygen absorbing resin composition according to the present invention is in a pellet or powder form. In still another preferred embodiment of the present invention, the oxygen absorbing resin composition of the present invention is used as the whole or a part of various package forms such as pouches, lids for containers, trays, cups, laminated tube containers, paper containers, bottles, deep drawn containers, vacuum molded containers, or blister containers.

Preferably, the oxygen absorbing resin composition of the present invention has a pellet shape. Pellets may be produced by any method without particular limitation. For example, pellets can be produced by melt-kneading a master batch containing the oxygen absorbing agent (I) and the thermoplastic resin (II), extruding the melt-kneaded product into strands, and pelletizing the strands. Alternatively, a pellet-shaped oxygen absorbing resin composition can be obtained by extruding the oxygen absorbing resin composition through a T-die into a sheet and then cutting the sheet.

According to another aspect of the present invention, there is provided an oxygen absorbing packaging body comprising: an oxygen absorbing resin composition in a pellet, powder, sheet, or film form; and a packaging material, the whole or a part of which is formed of an air-permeable packaging material, the oxygen absorbing resin composition having been packaged into the packaging material. Examples of the packaging material include a packaging material prepared by laminating two air-permeable packaging materials and forming a bag from the laminate, a packaging material prepared by laminating one air-permeable packaging material and one air-impermeable packaging material and forming a bag from the laminate, and a packaging material prepared by folding one air-permeable packaging material and mutually sealing edges except for the folded part to form a bag. Packaging materials permeable to oxygen is usable as the air-permeable material. Examples of such air-permeable packaging materials include papers, nonwoven fabrics, and plastic films that have been treated to render them permeable to air.

The oxygen absorbing resin composition according to the present invention can be applied to a region having high water activity to a region having a low water activity. Thus, the oxygen absorbing resin composition according to the present invention can be applied to commodities that have low water activity and should be stored under low-humidity drying conditions. The water activity refers to a measure of the content of free water in commodities and is expressed by a numeral value of 0 to 1 wherein the water activity of water-free commodities is 0 (zero) and the water activity of pure water is 1. That is, the water activity is defined as follows.

$$Aw = P/P_0 = RH/100$$

wherein Aw represents the water activity of a commodity; P represents a water vapor pressure within a space after the commodity is hermetically sealed and is brought to an equilibrium state; $P_0$ represents a water vapor pressure of pure water; and RH represents a relative humidity within the space, %.

In order to store commodities having a low water content that should be stored under low-humidity conditions, the relative humidity (RH) of an atmosphere in which the commodities having a low water content are stored is preferably 0 to 70% RH, more preferably 0 to 50% RH, particularly preferably 0 to 30% RH. Examples of commodities having a low water content (products to be packaged) to which the present invention is applicable include foods and pharmaceutical products that are weak against an increase in water content and are required to avoid inclusion of foreign materials, for example, powdery and granular foods (powder soups, powder beverages, powder confectioneries, seasoners, grain powders, nutritional foods, health foods, artificial colors, flavoring agents, and spices and condiments), powdery and granular pharmaceutical products (medicinal powders, powdered soaps, toothpastes, and industrial chemicals), and molded products (tablets) thereof.

Further, the oxygen absorbing resin composition according to the present invention can absorb oxygen regardless of whether or not objects to be stored contain moisture and thus is suitable for use, for example, in dried foods such as powder seasoners, powder coffees, coffee beans, rices, teas, beans, baked rice chips, and rice crackers, pharmaceutical products and health foods such as vitamin preparations.

According to another aspect of the present invention, there is provided a method for storing commodities, the method comprising: hermetically sealing a storing object together with an oxygen absorbing packaging body comprising an oxygen absorbing resin composition in a sheet, film, pellet, or powder form of the present invention and a packaging material, the whole or a part of which is formed of an air-permeable packaging material, the oxygen absorbing resin composition having been packaged into the packaging material; and storing the object with deoxygenation. According to a further aspect of the present invention, there is provided a method for storing commodities, the method comprising: hermetically sealing a storing object in the inner side of an oxygen absorbing resin composition in a sheet or film form according to the present invention; and storing the object with deoxygenation.

Oxygen Absorbing Multilayered Body

The oxygen absorbing multilayered body according to the present invention is a multilayered body comprising at least an oxygen absorbing layer (layer a) and a thermoplastic resin layer (layer b) provided on one or both sides of the oxygen absorbing layer (layer a). Individual layers of the oxygen absorbing multilayered body according to the present invention and components of the individual layers will be described in detail.

Oxygen Absorbing Layer (Layer a)

The oxygen absorbing layer (hereinafter referred to as layer a or OA) is a layer comprising an oxygen absorbing resin composition containing (I) an oxygen absorbing agent and (II) a thermoplastic resin. The oxygen absorbing resin composition may be the same as described above in connection with the oxygen absorbing resin composition.

Thermoplastic Resin Layer (Layer b)

The thermoplastic resin layer (layer b) is a layer comprising a thermoplastic resin composition containing a thermoplastic resin. The thermoplastic resin may be the same as described above in connection with the "thermoplastic resin (II)" in the oxygen absorbing resin composition.

When the multilayered body of the present invention should meet a requirement for an oxygen absorption speed, the use of a thermoplastic resin highly permeable to oxygen permeability as the thermoplastic resin used in the oxygen absorbing layer (layer a) and the thermoplastic resin layer (layer b) can allow oxygen to arrive at and to be absorbed in the metal of (I) that rapidly absorb oxygen. In this case, the oxygen permeability of the thermoplastic resin is preferably not less than 100 cc·20 μm/(m²·day·atm) (23° C., dry), more preferably not less than 1000 cc·20 μm/(m²·day·atm) (23° C., dry), still more preferably not less than 3000 cc·20 μm/(m²·day·atm) (23° C., dry), in terms of coefficient of oxygen permeation.

A multilayered body that exerts a high oxygen barrier capability through the absorption of oxygen in the oxygen absorbing layer while suppressing the invasion of oxygen can also be obtained by using a thermoplastic resin having a low oxygen permeability as the thermoplastic resin used in the oxygen absorbing layer (layer a) and the thermoplastic resin layer (layer b). In this case, the oxygen permeability of the thermoplastic resin is preferably not more than 100 cc·20 μm/(m²·day·atm) (23° C., dry), more preferably not more than 50 cc·20 μm/(m²·day·atm) (23° C., dry), still more preferably not more than 20 cc·20 μm/(m²·day·atm) (23° C., dry), in terms of coefficient of oxygen permeation.

In the oxygen absorbing multilayered body according to the present invention, the oxygen permeability of thermoplastic resin used in the oxygen absorbing layer (layer a) may be different from the oxygen permeability of the thermoplastic resin used in the thermoplastic resin layer (layer b).

For example, a construction may be adopted in which a polyethylene resin having a coefficient of oxygen permeation of 3000 cc·20 μm/(m²·day·atm) is used as the thermoplastic resin in the oxygen absorbing layer (layer a) and the thermoplastic resin layer (layer b) and an oxygen barrier layer having a construction of PE/EVOH/PE is used as a gas barrier layer (layer c) described below, thereby constituting an oxygen absorbing multilayered body (PE/EVOH/PE/OA/PE) of layer c/layer a/layer b. A package container having the layer c as the outer layer produced using the oxygen absorbing multilayered body may be used as a package container that can rapidly bring the gas atmosphere within the package container to a low-oxygen state or an oxygen-free state for a given period of time.

Examples of oxygen absorbing multilayered bodies include an oxygen absorbing multilayered body having a construction of layer b/layer a/layer b using a polyester resin having a coefficient of oxygen permeation of 80 cc·20 μm/(m²·day·atm) as the thermoplastic resin layer used in the oxygen absorbing layer (layer a) and the thermoplastic resin layer (layer b) and an oxygen absorbing multilayered body having a construction of layer b/layer a/layer b using a PVDC resin having a coefficient of oxygen permeation of 5 cc·20 μm/(m²·day·atm) as the thermoplastic resin used in the oxygen absorbing layer (layer a) and the thermoplastic resin layer (layer b).

Gas Barrier Layer (Layer c)

The oxygen absorbing multilayered body according to the present invention may further comprise a gas barrier layer (layer c). The gas barrier layer may be formed of a barrier resin using such as a polymethaxyleneadipamide resin (hereinafter referred to also as "MXD6 resin," an ethylene-vinyl alcohol copolymer resin (hereinafter referred to also as "EVOH resin"), polyvinylidene chloride (hereinafter referred to also as "PVDC"), or an amine-epoxy curing agent.

The gas barrier layer (layer c) may be formed of a barrier resin. The polymethaxyleneadipamide resin used in the barrier resin is a copolymer of methaxylenediamine with adipic acid. In the present invention, commercially available products may be suitably used. Examples of commercially available polymethaxyleneadipamide resins include MXD6nylon (manufactured by Mitsubishi Gas Chemical Company, Inc.)

An transition metal catalyst-containing inorganic acid salt or organic acid salt may be contained in the polymethaxyleneadipamide resin. The content of the transition metal catalyst-containing inorganic acid salt or organic acid salt is preferably 300 to 600 ppm, more preferably 350 to 500 ppm, in terms of the proportion of the metal to the gas barrier layer. When the content of the transition metal catalyst is approximately in the above-defined range, not only oxygen shielding function but also the absorption of dissolved oxygen in contents filled into a plastic container produced using the oxygen absorbing multilayered body according to the present invention can be provided. That is, in the contents filled into the container, since the amount of dissolved oxygen decreases with the elapse of time, a deterioration or the like can be suppressed when the contents are of some type.

Examples of transition metal catalysts include divalent or trivalent cobalt compounds or divalent copper metals. In particular, divalent or trivalent cobalt metals are preferred. Preferably, these cobalt metals are added as an organic acid salt to the polymethaxyleneadipamide resin and more preferably added as cobalt stearate or cobalt neodecanoate to the polymethaxyleneadipamide resin.

The resin constituting the gas barrier layer may be mixed into the polymethaxyleneadipamide resin so that the addition amount of the transition metal catalyst-containing inorganic acid salt or organic acid salt is as described above. Alternatively, a method may be adopted in which a master batch having a higher content is once prepared and may in use be diluted with a polymethaxyleneadipamide resin to give the above-defined content range.

PVDC may also be used as the barrier resin. PVDC is excellent in an oxygen barrier capability, as well as in a water vapor barrier capability, and thus is preferred for storage of contents that undergo a deterioration by the action of oxygen and water (moisture). A film consisting of PVDC only may also be used as the gas barrier layer. Alternatively, a commercially available film comprising a base film of a thermoplastic resin and PVDC coated on the base film (K Coat Film) may also be used. Examples of such base films include stretched polypropylene (OPP) and stretched nylon (ONY) polyethylene terephthalate (PET).

When the oxygen absorbing package container is produced using the oxygen absorbing multilayered body according to the present invention, some contents to be filled into the container undergo a deterioration or the like upon exposure to ultraviolet light. In particular, filling of pharmaceutical products and quasi-drugs into the container poses a problem of a deterioration of the filled products upon exposure to ultraviolet light. Accordingly, preferably, the gas barrier layer or the thermoplastic resin layer constituting the package container contains compounds having an ultraviolet shielding function. These compounds can be provided in the resin as the ultraviolet shielding layer. When recycleability and function of the container are taken into consideration, the addition of these compounds to the gas barrier layer or the thermoplastic resin layer is preferred.

Commonly commercially available ultraviolet absorbing agents (for example, Tinuvin) are suitable as the compound having the ultraviolet shielding function. These ultraviolet absorbing agents may be added to the melted polymer as a master batch or by liquid injection in the molding of the container. The resin that can shield ultraviolet light, for example, polyethylene naphthalate (that can shield a wavelength of not more than 380 nm) can be used to form a gas barrier layer having a multilayer structure. Further, not only ultraviolet light but also other various wavelengths may be shielded by adding colorants of black, red, or sepia color.

The wall thickness of the gas barrier layer constituting the package container is preferably 0.01 to 0.2 mm. When the wall thickness is in the above-defined range, a higher oxygen absorption function can be realized.

The gas barrier layer (layer c) may also be formed of a vapor-deposited membrane of either an inorganic material or an inorganic oxide or a metal foil. The vapor-deposited membrane may be formed using conventional publicly known inorganic materials or inorganic oxides by conventional publicly known methods. The composition and formation method thereof are not particularly limited. The vapor-deposited membrane may be formed on a resin film and may be used in the form of a vapor-deposited film. The provision of the gas barrier layer can impart a gas barrier capability, that is, a capability of preventing transmission of oxygen gas, water vapor and the like, and can also further impart or improve a light shielding capability, that is, a capability of preventing transmission of visible light, ultraviolet light and the like. The gas barrier layer may have a multilayer structure of two or more layers. When the barrier layer have a multilayer structure, the two or more layers may be the same or different in composition.

Examples of vapor-deposited membranes include those formed of inorganic materials or inorganic oxides such as silicon (Si), aluminum (Al), magnesium (Mg), calcium (Ca), potassium (K), tin (Sn), sodium (Na), boron (B), titanium (Ti), lead (Pb), zirconium (Zr), and yttrium (Y). Further, DLC (diamond-like carbon) membranes may also be used. In particular, vapor-deposited membranes of aluminum metal or vapor-deposited membranes of silicon oxide or aluminum oxides are suitable as materials for packaging (bags) and the like.

The inorganic oxides are represented by MOx such as $SiO_x$ or $AlO_x$ wherein M represents an inorganic element; and the range of the value of x varies depending upon inorganic elements. The range of the x value is 0 to 2 for silicon (Si), 0 to 1.5 for aluminum (Al), 0 to 1 for magnesium (Mg), 0 to 1 for calcium (Ca), 0 to 0.5 for potassium (K), 0 to 2 for tin (Sn), 0 to 0.5 for sodium (Na), 0 to 1.5 for boron (B), 0 to 2 for titanium (Ti), 0 to 1 for lead (Pb), 0 to 2 for zirconium (Zr), and 0 to 1.5 for yttrium (Y). x=0 means a substance that is a complete inorganic simple substance (a pure substance) and not transparent. The upper limit of the range of the x value is a value that means a completely oxidized state. Silicon (Si) and aluminum (Al) are suitable as the material for packaging. The x value may be in the range of 1.0 to 2.0 for silicon (Si) and in the range of 0.5 to 1.5 for aluminum (Al).

The thickness of the vapor-deposited membrane of the inorganic material or the inorganic oxide may vary depending, for example, upon the type of the inorganic material or the inorganic oxide but is preferably selected, for example, from a range of 50 to 2000 Å, preferably 100 to 1000 Å. More specifically, for the vapor-deposited membrane of aluminum, the thickness is preferably 50 to 600 Å, more preferably 100 to 450 Å, and, for the vapor-deposited membrane of aluminum oxide or silicon oxide, the thickness is preferably 50 to 500 Å, more preferably 100 to 300 Å.

Examples of methods for vapor-deposited membrane formation include physical vapor deposition methods (PVD methods) such as vacuum vapor deposition, sputtering, and ion plating methods, or chemical vapor deposition methods (CVD methods) such as plasma chemical vapor deposition, thermochemical vapor deposition, and photochemical vapor deposition methods.

The gas barrier layer (layer c) may be a metal foil obtained by rolling a metal. The metal foil may be a conventional publicly known meal foil. For example, an aluminum foil is preferred from the viewpoints of a gas barrier capability that prevents the transmission of oxygen gas, water vapor and the like and a light shielding capability that prevents the transmission of visible light, ultraviolet light and the like.

When an vapor-deposited membrane or a metal film of an inorganic material or an inorganic oxide is used in the gas barrier layer (layer c), preferably, a cushioning layer formed of a polyolefin, nylon or the like is interposed. The provision of the cushioning layer can improve rigidity and piercing strength of the multilayered body.

The thickness of the oxygen absorbing layer (layer a), the thickness of the thermoplastic resin layer (layer b), and the thickness of the gas barrier layer (layer c) are not particularly limited and may vary depending upon demanded properties. An example thereof will be described. When the design of an oxygen absorbing multilayered body that should meet a very high oxygen absorption speed requirement and the design of a packaging body that includes a thermoplastic resin layer (layer b) provided on the side of an object to be packaged are contemplated, since the thermoplastic resin layer (layer b) functions as a layer for the isolation between the oxygen absorbing layer (layer a) and a target gas, from which oxygen is to be absorbed, a rapid and good oxygen absorption speed can be realized by the use of a thermoplastic resin that is thin and has a large coefficient of oxygen permeation.

Adhesive Layer (Layer d)

The oxygen absorbing multilayered body according to the present invention may further comprise an adhesive layer (layer d) between the oxygen absorbing layer (layer a) and the thermoplastic resin layer (layer b). Further, the oxygen absorbing multilayered body according to the present invention may also further comprise the adhesive layer (layer d) provided between the oxygen absorbing layer (layer a) and the gas barrier layer (layer c), and between the thermoplastic resin layer (layer b) and the gas barrier layer (layer c). The provision of the adhesive layer formed of an adhesive or an adhesive resin layer can contribute to an improvement in interlayer strength.

Adhesives for lamination are suitable as the adhesive. Examples of such adhesives include one component-type or two component-type curing or noncuring vinyl-based, (meth) acryl-based, polyamide-based, polyester-based, polyether-based, polyurethane-based, epoxy-based, rubber-based and other solvent-type, aqueous-type, or emulsion-type or other adhesives for lamination. The adhesives may be coated, for example, by direct gravure roll coating, gravure roll coating, kiss coating, reverse roll coating, fountain coating, transfer roll coating, or other methods. The coverage is preferably approximately 0.1 $g/m^2$ to 10 $g/m^2$ (on a dry basis), more preferably approximately 1 $g/m^2$ to 5 $g/m^2$ (on a dry basis).

A resin layer formed of a thermoplastic resin is used as the adhesive resin layer. Specific example materials usable for the adhesive resin layer include low-density polyethylene resins, medium-density polyethylene resins, high-density polyethylene resins, linear low-density polyethylene resins, ethylene-α-olefin copolymer resins obtained by polymerization in the presence of a metallocene catalyst, ethylene-polypropylene copolymer resins, ethylene-vinyl acetate copolymer resins, ethylene-acrylic acid copolymer resins, ethylene-ethyl acrylate copolymer resins, ethylene-methacrylic acid copolymer resins, ethylene-methyl methacrylate copolymer resins, ethylene•maleic acid copolymer resins, ionomer resins, resins obtained by graft polymerization or copolymerization of polyolefin resins with unsaturated carboxylic acids, unsaturated carboxylic acids, unsaturated carboxylic acid anhydrides, or ester monomers, and resins obtained by graft modification of polyolefin resins with maleic anhydride. These materials may be used solely or in a combination of two or more of them.

Other Layers

The oxygen absorbing multilayered body according to the present invention may further comprise other layers. For example, a protective layer formed of a thermoplastic resin may be provided on the inner side or outer side of the gas barrier layer (layer c). Examples of resins usable for the protective layer include polyethylenes such as high-density polyethylenes, polypropylenes such as propylene homopolymers, propylene-ethylene random copolymers, propylene-ethylene block copolymers, polyamides (NY) such as nylon 6 and nylon 6,6, polyesters such as PETs, and combinations thereof.

Additives such as thermal stabilizers, reinforcing agents, fillers, flame retardants, colorants, plasticizers, ultraviolet absorbers, lubricants, deodorants, antistatic agents, antitack agents, anti-fogging agents, and surface treating agents may be further incorporated in the layers constituting the oxygen absorbing multilayered body according to the present invention as long as the effect of the present invention is not practically sacrificed. These additives may be properly selected from conventional additives publicly known in the field of oxygen absorbing agents and incorporated in a proper amount according to purposes. The additives may be incorporated by any method without particular limitation, for example, by melt-kneading individual components for constituting the oxygen absorbing multilayered body or by mixing individual components for constituting the oxygen absorbing multilayered body in a solution state and then removing the solvent.

A desiccant layer containing a desiccant may if necessary be stacked on the oxygen absorbing multilayered body of the present invention. Alternatively, a desiccant may be contained in any of the layers. The desiccant is not particularly limited, and conventional publicly known desiccants may be used. Examples thereof include molecular sieves, calcined alunites, clay minerals, zeolites, activated carbons, activated aluminas, silica gels, calcium oxide, barium oxide, strontium oxide, magnesium oxide, lithium sulfate, sodium sulfate, calcium sulfate, magnesium sulfate, cobalt sulfate, gallium sulfate, titanium sulfate, and nickel sulfate. Molecular sieves are particularly preferred.

Layer Construction of Oxygen Absorbing Multilayered Body

Figure 2:
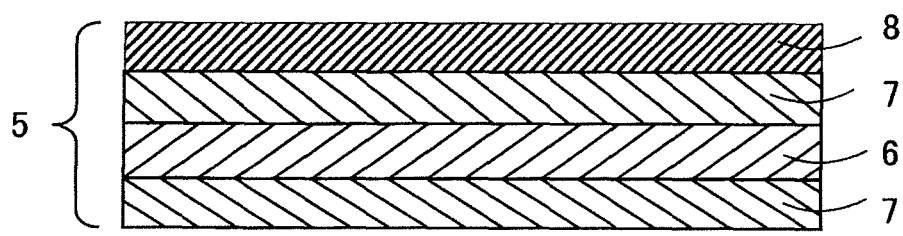
FIG. 2 is a schematic cross-sectional view of one example of an oxygen absorbing multilayered body according to the present invention.

A specific layer construction of the oxygen absorbing multilayered body according to the present invention will be exemplified below. FIGS. 1 and 2 are schematic cross-sectional views of examples of an oxygen absorbing multilayered body according to the present invention. An oxygen absorbing multilayered body 2 shown in FIG. 1 has a layer construction including an oxygen absorbing layer (layer a) 3 and a thermoplastic resin layer (layer b) 4 stacked on both sides of the oxygen absorbing layer (layer a) 3. An oxygen absorbing multilayered body 5 shown in FIG. 2 has a layer construction including an oxygen absorbing layer (layer a) 6, a thermoplastic resin layer (layer b) 7 provided on both sides of the oxygen absorbing layer (layer a) 6, and a gas barrier layer (layer c) 8 stacked on one of the thermoplastic resin layers (layer b) 7. An example of layer constructions other than the above layer constructions is one including a gas barrier layer (layer c), an oxygen absorbing layer (layer a), and a thermoplastic resin layer (layer b) stacked in that order.

Production and Use of Oxygen Absorbing Multilayered Body

The oxygen absorbing multilayered body according to the present invention may be formed into a desired shape by any method without particular limitation, and conventional publicly known methods may be used. For example, a method may be adopted in which the oxygen absorbing multilayered body is formed by solution casting, by extrusion through a die having a predetermined shape such as a T-die or a circular die with a uniaxial or multiaxial melt kneader, or by calendering with a calender roll. Further, the oxygen absorbing multilayered body may also be molded into desired shapes by vacuum molding, pressure molding and plug-assist molding. A method may also be adopted in which two or more films or sheets are stacked by dry lamination or extrusion lamination.

The form of the oxygen absorbing multilayered body according to the present invention is not particularly limited. For example, the oxygen absorbing multilayered body may be used in various forms such as pellets, films, sheets, trays, cups, PTP (press-through package) containers, bottles, tubes, blocks, deep drawn containers, vacuum molded containers, and caps.

The oxygen absorbing multilayered body according to the present invention may be in the form of preforms for oxygen absorbing package containers (also known as preforms). For example, coinjection molding may be used for molding of preforms. Oxygen absorbing package containers may be produced by subjecting preforms to biaxial stretching blow molding.

Oxygen absorbing package containers produced using the oxygen absorbing multilayered body can cope with temperatures used in package containers by properly selecting temperature characteristics of thermoplastic resins incorporated in the oxygen absorbing layer and the thermoplastic resin layer.

When an oxygen absorbing packaging body is formed by using the oxygen absorbing multilayered body according to the present invention as a part or the whole of a hermetically sealable package container so that the thermoplastic resin layer (layer b) is located as the innermost layer, not only a very small amount of oxygen that enters from outside the container but also oxygen within the container can be absorbed to prevent a deterioration caused by oxygen in products stored in the container.

A specific example of the construction in which the oxygen absorbing multilayered body is used as a part of the hermetically sealable package container include a construction in which the oxygen absorbing multilayered body is used on only one side of a body of a standing pouch and a barrier resin rather than the oxygen absorbing multilayered body is used in the other side of the body and the bottom portion. An example thereof is a layer construction in which the oxygen absorbing multilayered body is formed of silica vapor-deposited PET/NY/OA/PE and the barrier resin-containing portion is formed of silica vapor-deposited PET/NY/PE.

Another specific example of the construction in which the oxygen absorbing multilayered body is used as a part of the hermetically sealable package container include a construction in which a laminate including a barrier resin such as EVOH resin is used in a body of a deep drawn container and the oxygen absorbing multilayered body is used in a lid material. An example thereof is a layer construction in which the body of the deep drawn container is formed of PE/AL/PE/EVOH/PE and the lid material is formed of PE/AL/OA/easy-peel layer. Another example thereof is a layer construction in which the body of the container is formed of PVC/EVOH/PVC, a white pigment is added to the PVC layer as the outermost layer of the container, and the lid material is formed of NY/AL/OA/PVC.

When the easy-peel layer is provided on the hermetically sealable container, examples of preferred layer constructions of the oxygen absorbing multilayered body include NY/PE/AL/PE/OA/easy-peel layer and PE/AL/OA/easy-peel layer.

A method may be adopted in which the oxygen absorbing multilayered body and a product to be packaged are placed in the package container, and the container is hermetically sealed to bring the inside of the packaged body to a low-oxygen state or an oxygen-free state. Alternatively, a method may be adopted in which a product to be packaged is placed in the package container, at least a part of which is formed of the oxygen absorbing multilayered body, and the container is hermetically sealed to bring the inside of the packaged body to a low-oxygen state or an oxygen-free state.

The oxygen absorbing multilayered body according to the present invention can absorb oxygen regardless of water activity and can be applied to a region having high water activity to a region having a low water activity. Further, the oxygen absorbing multilayered body according to the present invention can be suitably applied to commodities that have low water activity and should be stored under low-humidity drying conditions. The water activity refers to a measure of the content of free water in commodities and is expressed by a numeral value of 0 to 1 wherein the water activity of water-free commodities is 0 (zero) and the water activity of pure water is 1. That is, the water activity is defined as follows.

$$Aw = P/P_0 = RH/100$$

wherein Aw represents the water activity of a commodity; P represents a water vapor pressure within a space after the commodity is hermetically sealed and is brought to an equilibrium state; $P_0$ represents a water vapor pressure of pure water; and RH represents a relative humidity within the space, %.

The oxygen absorbing multilayered body according to the present invention as such may also be used as oxygen barrier packaging materials such as aluminum vapor-deposited films, silica vapor-deposited films, PVDC-coated films, and EVOH-based barrier films, for a given period of time until the capability of the incorporated oxygen absorbing agent is completely lost. Further, the multilayered body may be used in combination with the oxygen barrier layer (layer c) and used with a view to imparting (improving) a higher oxygen barrier capability than that of the oxygen barrier layer (layer c) for a given period of time until the capability the incorporated oxygen absorbing agent is completely lost.

The oxygen absorbing multilayered body according to the present invention can absorb oxygen regardless of whether or not objects to be stored contain moisture or water and thus is suitable for use, for example, in medical supplies, pharmaceutical products (such as Atorvastatin and Levothyroxine), transfusion preparations, electronic component, granular foods (powder soups, powder beverages, powder confectioneries, seasoners, grain powders, nutritional foods, health foods, artificial colors, flavoring agents, and spices and condiments), dried foods such as powder coffees, coffee beans, rices, teas, beans, baked rice chips, and rice crackers, granular pharmaceutical products (medicinal powders, powdered soaps, toothpastes, and industrial chemicals), and molded products (tablets) thereof.

A method for storing commodities that can deoxygenate and store a storing product even in a low-humidity atmosphere of not more than 30% RH (25° C.) by using the oxygen absorbing multilayered body according to the present invention or the oxygen absorbing package container produced using the multilayered body can be provided.

Oxygen Absorbing Hollow Container

The oxygen absorbing hollow container according to the present invention comprises at least an oxygen absorbing layer (layer a). Individual layers and components thereof of the oxygen absorbing hollow container according to the present invention will be described in detail.

Oxygen Absorbing Layer (Layer a)

The oxygen absorbing layer (layer a) is a layer formed of an oxygen absorbing resin composition containing (I) an oxygen absorbing agent and (II) a thermoplastic resin. The oxygen absorbing resin composition may be the same as described above in connection with the oxygen absorbing resin composition.

Thermoplastic Resin Layer (Layer b)

In the oxygen absorbing hollow container according to the present invention, at least one of the innermost layer and the outermost layer is preferably a thermoplastic resin layer (layer b). The thermoplastic resin layer (layer b) is a layer formed of a thermoplastic resin-containing thermoplastic resin composition. The thermoplastic resin layer (layer b) may be the same as described above in connection with "(II) thermoplastic resin" in the oxygen absorbing resin composition.

The oxygen absorbing layer (layer a) and the thermoplastic resin layer (layer b) in the oxygen absorbing hollow container according to the present invention may be formed of mutually different types of thermoplastic resins.

The thermoplastic resin may be selected according to purposes. For example, when oxygen in the inside of the hollow container should be absorbed at a certain speed, a thermoplastic resin having a high coefficient of oxygen permeation may be used in a layer located near the inner side of the hollow container. In this case, the oxygen permeability of the thermoplastic resin is preferably not less than 200 cc·20 μm/(m²·day·atm) (23° C., dry), more preferably not less than 1000 cc·20 μm/(m²·day·atm) (23° C., dry), still more preferably not less than 3000 cc·20 μm/(m²·day·atm) (23° C., dry), in terms of the coefficient of oxygen permeation. In particular, polyethylene-based resins and polypropylene-based resins are useful from a practical viewpoint.

Conversely, when a thermoplastic resin having a low coefficient of oxygen permeation is provided in a layer located near the outer side of the hollow container, permeation of oxygen into the hollow container can be suppressed. In this case, the oxygen permeability of the thermoplastic resin is preferably not more than 100 cc·20 μm/(m²·day·atm) (23° C., dry), more preferably not more than 50 cc·20 μm/(m²·day·atm) (23° C., dry), still more preferably not more than 10 cc·20 μm/(m²·day·atm) (23° C., dry), in terms of the coefficient of oxygen permeation. In particular, polyester resins and chlorine-based resins are useful from a practical viewpoint.

Preferably, the thermoplastic resin layer (layer b) provided on the outer side of the oxygen absorbing layer (layer a) contains a white pigment. The addition of the white pigment can realize a white appearance of the container while maintaining a high level of light shielding capability, making it possible to realize a hollow container free from a feeling of strangeness in the provision of product labels or prints on the outermost layer of the hollow container. The white pigment may be a publicly known substance. An example of preferred white pigments is titanium oxide.

The content of the white pigment is preferably 5 to 30 parts by weight, more preferably 10 to 20 parts by weight, based on 100 parts by weight of the thermoplastic resin in the thermoplastic resin layer (layer b). When the content of the white pigment is in the above-defined range, unlike a content of the white pigment of less than 5 parts by weight, a satisfactory coloring effect can be obtained even in a reduced thickness of the layer b, and, thus, the degree of freedom in design of the layer construction can be advantageously ensured. Further, when the content of the white pigment is in the above-defined range, unlike a content of the white pigment of more than 30 parts by weight, the strength of the hollow container can be advantageously enhanced.

Gas Barrier Layer (Layer c)

The oxygen absorbing hollow container according to the present invention may further comprise a gas barrier layer (layer c). The gas barrier layer (layer c) may be the same as described above in connection with the gas barrier layer (layer c) in the oxygen absorbing multilayered body.

Adhesive Layer (Layer d)

The hollow container according to the present invention may further comprise an adhesive layer (layer d) interposed between any two layers selected from the oxygen absorbing layer (layer a), the thermoplastic resin layer (layer b), and the gas barrier layer (layer c). The adhesive barrier layer (layer d) may be the same as described above in connection with the adhesive barrier layer (layer d) in the oxygen absorbing multilayered body.

Other Layers

In the oxygen absorbing hollow container according to the present invention, a recycled resin layer containing a recycled material (a ground product) derived from the hollow container may also be separately provided from the viewpoint of reducing wastes produced from the production process. In this case, preferably, the recycled resin layer is provided as a layer other than the innermost layer from the viewpoint of hygiene.

Light Shielding Material

Preferably, at least one layer in the oxygen absorbing hollow container according to the present invention contains a light shielding material. In the present invention, any of light shielding materials that reduce the transmittance of ultraviolet light or visible light may be used without particular limitation. For example, publicly known pigments are usable. The color of pigments is not particularly limited and may be properly selected according to applications. Examples thereof include: black pigments, for example, carbon black, organic black pigments such as aniline black and perylene black, inorganic blacks containing copper, iron, chromium, manganese, and cobalt, titanium black, and black interference aluminum pigments; and white pigments such as titanium oxide, zinc oxide, zirconia oxide, alumina powder, magnesium oxide, and zinc sulfide. Among the light shielding materials, black pigments and/or white pigments are preferred, and carbon black, titanium black, and titanium oxide are particularly preferred. One type of or a mixture of two or more of the light shielding materials may be used. Contents that are likely to be deteriorated upon exposure to ultraviolet light or visible light can be stored for a long period of time by using the light shielding material. The light shielding material according to the present invention may be incorporated in any layer constituting the hollow container but is preferably incorporated in the oxygen absorbing layer (layer a). The light shielding material can impart a light shielding capability to the hollow container and, at the same time, can mask a color change caused by oxidation of the metal of (I) that is the oxygen absorbing agent, to such an extent that the color change is unnoticeable with the naked eye. Accordingly, hollow containers having a good appearance can be provided that do not undergo a color change in the whole hollow container, particularly in the end face of the opening, after oxygen absorption, as compared with the state of the hollow container before oxygen absorption.

The content of the light shielding material is preferably 0.1 to 10 parts by weight, more preferably 0.5 to 5 parts by weight, particularly preferably 1.0 to 4.0 parts by weight, based on 100 parts by weight of the thermoplastic resin (II). When the content of the light shielding material is in the above-defined range, the light shielding capability is higher than that when the content of the light shielding material is less than 0.1 part by weight. Further, when the content of the light shielding material is in the above-defined range, the moldability is higher than that when the content of the light shielding material is larger than 10 part by weight.

When the light shielding material is used in combination with compounds having the function of shielding ultraviolet light or visible light, the light shielding capability of the hollow container can be further enhanced. Commonly commercially available ultraviolet absorbers (for example, Tinuvin) are suitable. These ultraviolet absorbing agents may be added to the melted polymer as a master batch or by liquid injection in the molding of the container. The resin that can shield ultraviolet light, for example, polyethylene naphthalate (that can shield a wavelength of not more than 380 nm) can be used to form a gas barrier layer having a multilayer structure. Further, not only ultraviolet light but also other various wavelengths may be shielded by adding colorants of black, red, or sepia color.

Desiccant

In the oxygen absorbing hollow container according to the present invention, when the presence of water is not favorable for contents filled into the hollow container, preferably, at least one layer contains a desiccant. The desiccant is not particularly limited, and conventional publicly known desiccants may be used. Examples thereof include molecular sieves, calcined alunites, clay minerals, zeolites, activated carbons, activated aluminas, silica gels, calcium oxide, barium oxide, strontium oxide, magnesium oxide, lithium sulfate, sodium sulfate, calcium sulfate, magnesium sulfate, cobalt sulfate, gallium sulfate, titanium sulfate, and nickel sulfate. Molecular sieves are particularly preferred. For layers in which the desiccant is incorporated, preferably, the desiccant is not incorporated in the gas barrier layer (layer c) because there is a possibility that the barrier capability of the gas barrier layer (layer c) is deteriorated. The incorporation of the desiccant in the adhesive layer (layer d) is preferably avoided because t the interlayer strength is likely to be lowered. Accordingly, preferably, the desiccant is incorporated in the thermoplastic resin layer (layer b). Further, the oxygen absorbing agent used in the present invention does not require the presence of water or moisture and absorbs oxygen and, thus, the desiccant is preferably incorporated in the oxygen absorbing layer (layer a).

Thickness of Each Layer of Oxygen Absorbing Hollow Container

The thickness of each layer of the oxygen absorbing hollow container according to the present invention can be properly selected while taking into consideration, for example, layer construction, the form and applications of the container, and required physical properties. The thickness of the oxygen absorbing layer (layer a) is preferably 5 μm to 500 μm, more preferably 10 μm to 200 μm. The thickness of the thermoplastic resin layer (layer b) when provided on the outermost side of the oxygen absorbing hollow container is preferably 300 μm to 2000 μm, more preferably 500 μm to 1000 μm. On the other hand, the thickness of the thermoplastic resin layer (layer b) when provided on the innermost side of the oxygen absorbing hollow container is preferably 5 μm to 200 μm, more preferably 10 μm to 100 μm. The thickness of the gas barrier layer (layer c) is preferably 5 μm to 200 μm, more preferably 20 μm to 100 μm. The thickness of the adhesive layer (layer d) is preferably 5 μm to 200 μm, more preferably 20 μm to 100 μm.

The proportion of the thickness of the gas barrier layer to the total thickness of the layers constituting the oxygen absorbing hollow container according to the present invention is not particularly limited. The thickness of the gas barrier layer (layer c) is preferably 1 to 20%, more preferably 1.5 to 15%, still more preferably 2 to 10%, based on the total thickness of the layers constituting the oxygen absorbing hollow container. When the proportion of the thickness of the gas barrier layer (layer c) is not less than 1%, the gas barrier capability can be improved. On the other hand, when the proportion of the thickness of the gas barrier layer (layer c) is not more than 20%, the impact resistance can be further improved.

The total thickness of the layers constituting the oxygen absorbing hollow container according to the present invention is also not particularly limited and may be properly selected while taking into consideration, for example, layer construction, the form and applications of the container, and required physical properties.

Layer Construction of Oxygen Absorbing Hollow Container

Figure 3:
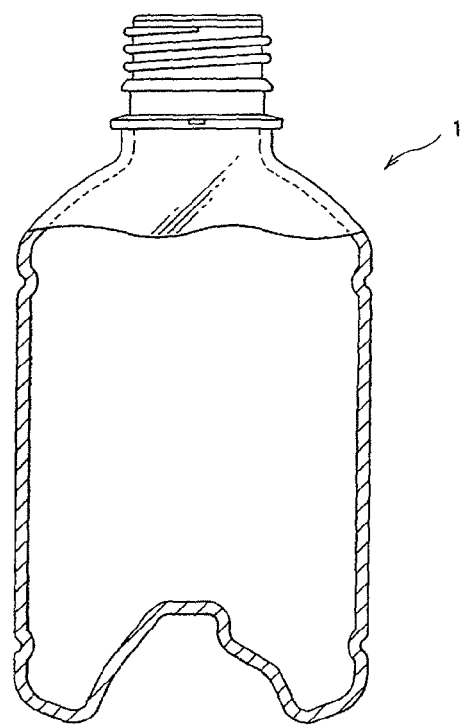
FIG. 3 is a schematic cross-sectional view of one example of an oxygen absorbing hollow container according to the present invention.

Specific examples of the layer construction of the oxygen absorbing hollow container according to the present invention will be described. FIG. 3 is a representative schematic view of an oxygen absorbing hollow container according to the present invention. FIGS. 4 to 9 are schematic cross-sectional views of examples of oxygen absorbing hollow containers according to the present invention.

Figure 4:
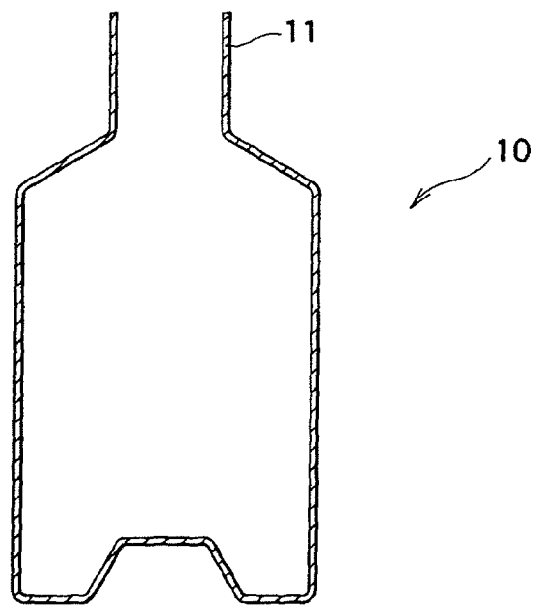
FIG. 4 is a schematic cross-sectional view of one example of an oxygen absorbing hollow container according to the present invention.

An oxygen absorbing hollow container 10 shown in FIG. 4 has a single-layer structure and consists of an oxygen absorbing layer (layer a) 11 only.

Figure 5:
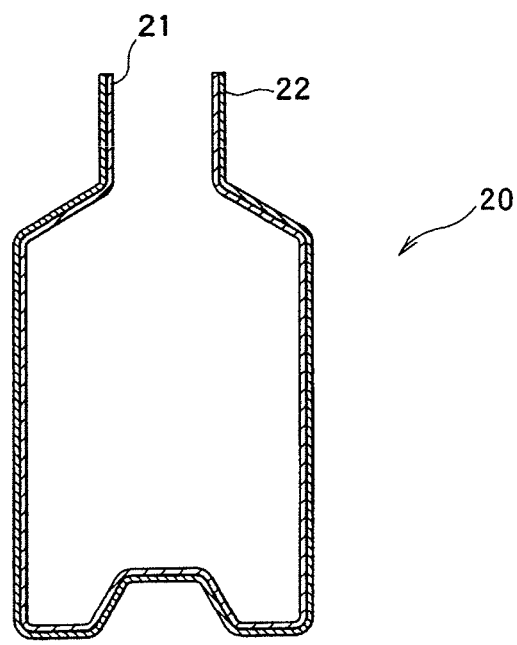
FIG. 5 is a schematic cross-sectional view of one example of an oxygen absorbing hollow container according to the present invention.

An oxygen absorbing hollow container 20 shown in FIG. 5 has an oxygen absorbing layer (layer a) 21 on the innermost side thereof and a thermoplastic resin layer (layer b) 22 on the outermost side thereof.

Figure 6:
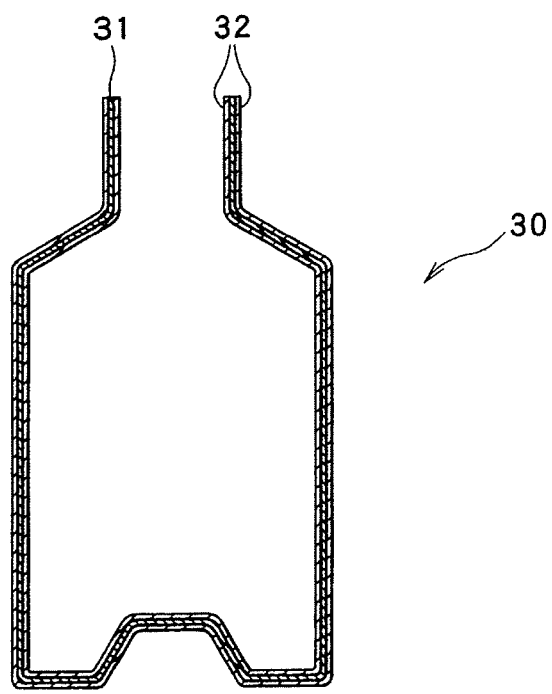
FIG. 6 is a schematic cross-sectional view of one example of an oxygen absorbing hollow container according to the present invention.

An oxygen absorbing hollow container 30 shown in FIG. 6 has an oxygen absorbing layer (layer a) 31 as an intermediate layer and a thermoplastic resin layer (layer b) 32 on both sides of the oxygen absorbing layer (layer a) 31.

Figure 7:
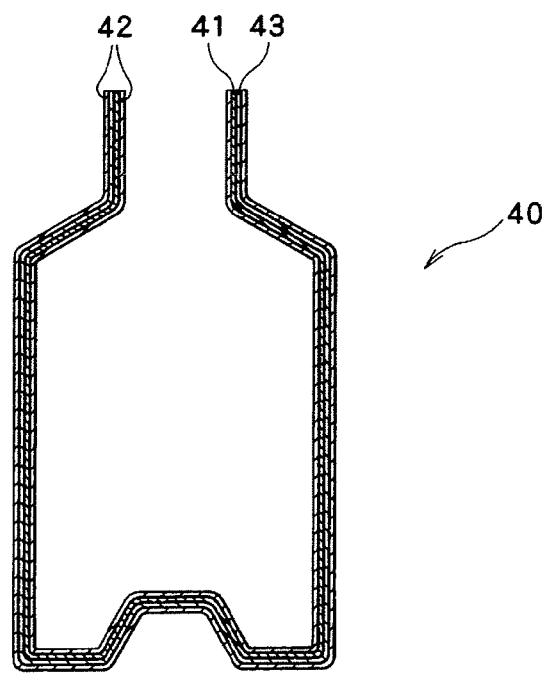
FIG. 7 is a schematic cross-sectional view of one example of an oxygen absorbing hollow container according to the present invention.

An oxygen absorbing hollow container 40 shown in FIG. 7 includes a thermoplastic resin layer (layer b) 42, a gas barrier layer (layer c) 43, an oxygen absorbing layer (layer a) 41, and a thermoplastic resin layer (layer b) 42 stacked in that order as viewed from the outer surface toward the inner surface.

Figure 8:
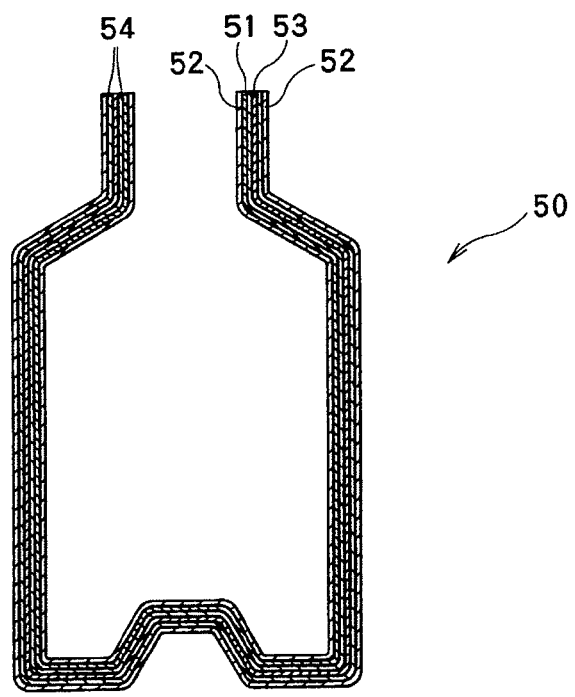
FIG. 8 is a schematic cross-sectional view of one example of an oxygen absorbing hollow container according to the present invention.

An oxygen absorbing hollow container 50 shown in FIG. 8 includes a thermoplastic resin layer (layer b) 52, an adhesive layer (layer d) 54, a gas barrier layer (layer c) 53, an adhesive layer (layer d) 54, an oxygen absorbing layer (layer a) 51, and a thermoplastic resin layer (layer b) 52 stacked in that order as viewed from the outer surface toward the inner surface.

Figure 9:
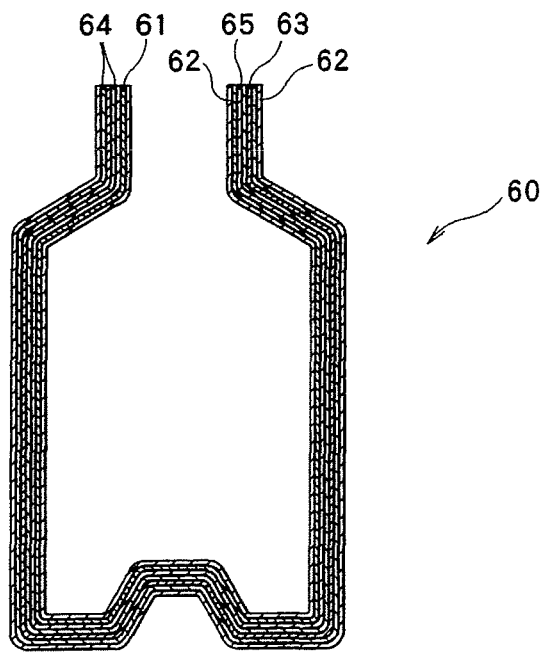
FIG. 9 is a schematic cross-sectional view of one example of an oxygen absorbing hollow container according to the present invention.

An oxygen absorbing hollow container 60 shown in FIG. 9 includes a thermoplastic resin layer (layer b) 62, an adhesive layer (layer d) 64, a gas barrier layer (layer c) 63, an adhesive layer (layer d) 64, a recycle layer 65, an oxygen absorbing layer (layer a) 61, and a thermoplastic resin layer (layer b) 62 stacked in that order as viewed from the outer surface toward the inner surface.

Production of Oxygen Absorbing Hollow Container

The oxygen absorbing hollow container according to the present invention may be produced by conventional publicly known methods without particular limitation. Examples thereof include an extrusion blow molding method that includes forming a parison by melt extrusion and blow-molding the parison, and an injection blow molding method that includes forming a preform by injection molding and blow-molding the preform. For example, a production method may also be adopted in which a bottle is formed by molding from a multilayered film/multilayered sheet with a machine available from AGAMI in France. A specific production method using this producing machine includes cutting a multilayered sheet into strips, molding the strips around a blow pipe into a tube shape, then fusing the strips to each other in a longitudinal direction to prepare a plastic tube, heating the plastic tube thus molded, and blow-molding the plastic tube into a bottle in the mold.

Use of Oxygen Absorbing Hollow Container

The oxygen absorbing hollow container according to the present invention can be applied to a region having high water activity to a region having a low water activity. Thus, the oxygen absorbing hollow container according to the present invention can be applied to commodities that have low water activity and should be stored under low-humidity drying conditions. The water activity refers to a measure of the content of free water in commodities and is expressed by a numeral value of 0 to 1 wherein the water activity of water-free commodities is 0 (zero) and the water activity of pure water is 1. That is, the water activity is defined as follows.

$$Aw = P/P_0 = RH/100$$

wherein Aw represents the water activity of a commodity; P represents a water vapor pressure within a space after the commodity is hermetically sealed and is brought to an equilibrium state; $P_0$ represents a water vapor pressure of pure water; and RH represents a relative humidity within the space, %.

The oxygen absorbing hollow container according to the present invention can absorb oxygen regardless of whether or not objects to be stored contain moisture or water. Accordingly, contents of the oxygen absorbing hollow container may range from water such as mineral water to products having a low water content preferably stored at 0 to 30% RH and water-free products. Products having a low water content include foods and chemical products in which an increase in the content of water or moisture is not favorable, for example, powdery and granular foods (powder soups, powder beverages, powder confectioneries, seasoners, grain powders, nutritional foods, health foods, artificial colors, flavoring agents, and spices and condiments), powdery and granular pharmaceutical products (medicinal powders, powdered soaps, toothpastes, and industrial chemicals), and molded products (tablets) thereof. Examples of water-free products include industrial components and pharmaceutical products (such as Atorvastatin and Levothyroxine).

EXAMPLES

The present invention is further illustrated by the following Examples and Comparative Examples. However, the present invention is by no means to be construed as being limited to them.

Example 1

An Al (aluminum) powder (50% by weight) and an Fe (iron) powder (50% by weight) were mixed together and were dissolved in each other in nitrogen to obtain an Al—Fe alloy. The Al—Fe alloy thus obtained was ground with a jaw crusher, a roll crusher, and a ball mill, and the ground product was classified with a net having an opening of 200 meshes (0.075 mm) to obtain an Al—Fe alloy having a particle size of not more than 200 meshes. The Al—Fe alloy powder (150 g) thus obtained was mixed while stirring for one hour in a 30% (by weight) aqueous sodium hydroxide solution of 50° C. The mixed solution was allowed to stand, and the supernatant liquid was removed. The residual precipitate was washed with distilled water until pH became 10 or less to obtain a porous Al—Fe metal powder. In order to avoid contact with oxygen, the porous metal powder was obtained by a reaction in an aqueous solution.

The porous metal powder thus obtained was dried in vacuo under conditions of not more than 200 Pa and 80° C. to a water content of not more than 1% by weight to obtain a dried product of a porous Al—Fe metal powder (the dried product of the porous Al—Fe metal powder being hereinafter referred to as "metal powder 1"). The metal powder 1 had a bulk density of 1.3 g/cm$^3$ (as measured according to JIS Z 2504). The metal powder 1 (1 g) was packaged in an air-permeable small bag and, together with a desiccant, was placed in a gas barrier bag (an Al foil-laminated plastic bag). The gas barrier bag was filled with 500 mL of air (oxygen concentration: 20.9% by volume), was hermetically sealed, and was stored at 25° C. for one day.

The concentration of oxygen within the gas barrier bag after the storage at 25° C. for one day was measured by gas chromatography and was found to be 4.1% by volume. The amount of oxygen absorbed was calculated from the reduced oxygen concentration within the gas barrier bag and was found to be 87.6 mL/g.

The average particle diameter of the metal powder 1 was measured with a particle size/shape distribution measuring device ("PITA-2," manufactured by Seishin Enterprise Co., Ltd.) and was found to be 31 μm.

The specific surface area of the metal powder 1 was measured with an automatic specific surface area measuring device ("GEMINI VI12390," manufactured by Shimadzu Seisakusho Ltd.) and was found to be 37.0 m$^2$/g. The results were as shown in Table 1.

The metal powder 1 and a linear low density polyethylene (available from Ube Maruzen Polyethylene Co, Ltd., MFR 4.0 g/10 min (measured according to JIS K 7210), hereinafter abbreviated to as "LLDPE") were melt kneaded at a ratio of LLDPE:metal powder 1=50:50 with a twin screw extruder to obtain an "oxygen absorbing resin composition pellet A." The oxygen absorbing resin composition pellet A had a density of 1.62 g/cm$^3$. The starting materials were introduced into the twin screw extruder by two types of feeders, a main feeder and a side feeder, the atmosphere of which had been replaced by a nitrogen gas. LLDPE was introduced through the main feeder, and the metal powder 1 was introduced into the melted LLDPE through the side feeder.

The oxygen absorbing resin composition pellet A thus obtained was pressed at 180° C. in nitrogen with a pressing machine to obtain an oxygen absorbing resin film having a mean thickness of about 200 μm.

The appearance of the oxygen absorbing resin film was evaluated according to the following criteria and was found to be ⊚ (good).

Evaluation criteria of film appearance:
◎: Good film appearance. That is, the film is smooth and has a proper strength.
○: Good film appearance. The film is smooth.
Δ: Acceptable film appearance. However, the film is fragile and has holes in a part thereof.
×: Unsatisfactory as film. The appearance is also not good.

The oxygen absorbing resin film thus obtained was cut out into a size of 10 cm×10 cm. The weight of the cut film was 3.25 g, and the weight of the metal powder 1 contained in the film when calculated from the weight ratio between LLDPE and the metal powder 1 in the film was 1.62 g. The film together with a desiccant was placed in a gas barrier bag (an Al (aluminum) laminated plastic bag), and 400 mL of air (oxygen concentration 20.9%) was filled into the gas barrier bag. The gas barrier bag was then hermetically sealed and was stored at 25° C. for 30 days.

The concentration of oxygen within the gas barrier bag stored at 25° C. for 30 days was measured with a gas chromatograph. As a result, the concentration of oxygen within the gas barrier bag was 5.5% by volume. The amount of oxygen absorbed in the resin composition when calculated from a reduced oxygen concentration within the gas barrier bag was 40.2 mL/g per unit weight of the metal powder 1 contained in the oxygen absorbing resin.

The results were as shown in Table 2.

Example 2

A dried product of an Al—Ni porous metal powder (the dried product of an Al—Ni porous metal powder being hereinafter referred to as "metal powder 2") was obtained in the same manner as in Example 1, except that Ni (nickel) was used instead of Fe (iron). The metal powder 2 thus obtained had a bulk density of 1.4 g/cm$^3$. The oxygen absorbing capability, the mean particle diameter, and the specific surface area of the metal powder 2 were measured in the same manner as in Example 1. As a result, the concentration of oxygen within the gas barrier, the absorption amount of oxygen, the mean particle diameter, and the specific surface area were 5.8%, 80.1 mL/g, 18 μm, and 80.0 m$^2$/g, respectively.

The metal powder 2 and an ethylene-propylene random copolymer (available from Japan Polypropylene Corporation, MFR 1.3 g/10 min, hereinafter referred to as PP) were melt kneaded at a ratio of PP:metal powder 2=70:30 to obtain an "oxygen absorbing resin composition pellet B." The oxygen absorbing resin composition pellet B had a density of 1.24 g/cm$^3$.

The oxygen absorbing resin composition pellet B was ground with a grinding machine (a turbo disk mill manufactured by FREUND-TURBO CORPORATION) to obtain an oxygen absorbing resin powder. The oxygen absorbing resin powder (3.0 g) was weighed. The weight of the metal powder 2 contained in 3.0 g of the oxygen absorbing resin powder was 0.90 g. The oxygen absorbing resin powder was packaged in an air-permeable small bag and, together with a desiccant, was placed in a gas barrier bag (an Al foil-laminated plastic bag). The concentration of oxygen within the gas barrier bag stored at 25° C. for 30 days was measured in the same manner as in Example 1. As a result, the concentration of oxygen within the gas barrier bag was 15.1% by volume, and the amount of oxygen absorbed per unit weight of the metal powder 2 contained in the oxygen absorbing resin powder was 30.4 mL/g.

Example 3

An oxygen absorbing resin film having a mean thickness of about 200 μm was obtained in the same manner as in Example 1, except that the weight ratio in the melt kneading was LLDPE:metal powder 1=25:75. The oxygen absorbing resin film had a density of 2.67 g/cm$^3$. The appearance of the oxygen absorbing resin film when evaluated according to evaluation criteria described in the column of Example 1 was "○." Although the appearance of the film was good, the film was fragile and had some holes.

In the same manner as in Example 1, the oxygen absorbing resin film thus obtained was cut out into a size of 10 cm×10 cm, the film together with a desiccant was placed in a gas barrier bag (an Al (aluminum) laminated plastic bag), and the gas barrier bag was stored at 25° C. for 30 days. The weight of the cut film was 5.34 g, and the weight of the metal powder 1 contained in the cut film was 4.00 g. The concentration of oxygen within the gas barrier bag stored at 25° C. for 30 days was measured and found to be not more than 0.1% by volume. The amount of oxygen absorbed was 20.8 mL/g per unit weight of the metal powder 1 contained in the oxygen absorbing resin film.

Comparative Example 1

An iron powder (200 kg) having a mean particle diameter of 35 μm was introduced into a closed ribbon mixer with a heating jacket. A 45% (by weight) aqueous calcium chloride solution (70 kg) was sprayed on the iron powder while mixing the iron powder at 150° C. under a reduced pressure of 1.5 kPa, followed by drying. The dried product was sieved to remove coarse particles to obtain an iron-based oxygen absorbing agent having a mean particle diameter of 35 μm (hereinafter referred to as "metal powder 3"). The metal powder 3 thus obtained had a bulk density of 2.7 g/cm$^3$. The oxygen absorbing capability and the specific surface area of the metal powder 3 were measured in the same manner as in Example 1. As a result, the concentration of oxygen within the gas barrier bag, the amount of oxygen absorbed, and the specific surface area were 20.5% by volume, 2.5 mL/g, and 0.1 m$^2$/g, respectively.

An oxygen absorbing resin film having a mean thickness of about 200 μm was obtained in the same manner as in Example 1, except that the metal powder 3 and LLDPE were melt-kneaded at LLDPE:metal powder 3=70:30. The oxygen absorbing resin film had a density of 1.24 g/cm$^3$. The appearance of the oxygen absorbing resin film when evaluated according to evaluation criteria described in the column of Example 1 was "◎ (good)."

In the same manner as in Example 1, the oxygen absorbing resin film thus obtained was cut out into a size of 10 cm×10 cm, the film together with a desiccant was placed in a gas barrier bag (an Al (aluminum) laminated plastic bag), and the gas barrier bag was stored at 25° C. for 30 days. The weight of the cut film was 2.48 g, and the weight of the metal powder 3 contained in the cut film was 0.75 g. The concentration of oxygen within the gas barrier bag stored at 25° C. for 30 days was measured and found to be 20.7% by volume. The amount of oxygen absorbed was 1.4 mL/g per unit weight of the metal powder 3 contained in the oxygen absorbing resin film.

Comparative Example 2

The oxygen absorbing capability and the specific surface area of the metal powder 4 were measured in the same manner as in Example 1, except that a Ni powder (manufactured by Toho Titanium Co., Ltd., bulk density 3.5 g/cm$^3$, hereinafter referred to as metal powder 4) having a mean particle diameter of 0.6 μm was used as the metal powder instead of the metal powder 1. As a result, the concentration of oxygen within the gas barrier bag, the amount of oxygen absorbed, and the specific surface area were 20.8% by volume, not more than 1.0 mL/g, and 2.0 m²/g, respectively.

An oxygen absorbing resin film having a mean thickness of about 200 μm was obtained in the same manner as in Example 1, except that the metal powder 4 and LLDPE were melt-kneaded at LLDPE:metal powder 4=70:30. The oxygen absorbing resin film had a density of 1.25 g/cm³. The appearance of the oxygen absorbing resin film when evaluated according to evaluation criteria described in the column of Example 1 was "⊚ (good)."

In the same manner as in Example 1, the oxygen absorbing resin film was cut out into a size of 10 cm×10 cm, the film together with a desiccant was placed in a gas barrier bag (an Al (aluminum) laminated plastic bag), and the gas barrier bag was stored at 25° C. for 30 days. The weight of the cut film was 2.49 g, and the weight of the metal powder 4 contained in the cut film was 0.75 g. The concentration of oxygen within the gas barrier bag stored at 25° C. for 30 days was measured and found to be 20.8% by volume. The amount of oxygen absorbed per unit weight of the metal powder 4 contained in the oxygen absorbing resin film was not more than 1.0 mL/g.

TABLE 1

| Composition of metal powder[1] | Mean particle diameter (μm) | Specific surface area by BET method (m²/g) | Bulk density (g/cm3) | Amount of oxygen absorbed (mL/g) |
|---|---|---|---|---|
| Metal powder 1[2] | Fe (93) Al (7) | 31 | 37.0 | 1.3 | 87.6 |
| Metal powder 2[2] | Ni (91) Al (9) | 18 | 80.0 | 1.4 | 80.1 |
| Metal Powder 3 | Fe (100) | 35 | 0.1 | 2.7 | 2.5 |
| Metal powder 4 | Ni (100) | 0.6 | 2.0 | 3.5 | 1.0 or less |

[1]Numerals in parentheses indicate % by weight of individual components
[2]Metal powder 1 and metal powder 2 are porous metal powder obtained by eluting and removing a part of Al.

TABLE 2

| | Oxygen absorbing resin composition | | | | Amount of oxygen absorbed in resin composition (per unit weight of metal powder)[2] |
|---|---|---|---|---|---|
| | Thermoplastic resin | Metal powder | Composition[1] | Film Appearance | |
| Example 1 | Linear low-density polyethylene (LLDPE) | Metal powder 1 | 50:50 | ⊚ | 40.2 mL/g |
| Example 2 | Ethylene-propylene random copolymer (PP) | Metal powder 2 | 70:30 | — | 30.4 mL/g |
| Example 3 | Linear low-density polyethylene (LLDPE) | Metal powder 1 | 25:75 | ○ | 20.8 mL/g |
| Comparative Example 1 | Ethylene-propylene random copolymer (PP) | Metal powder 3 | 70:30 | ⊚ | 1.4 mL/g |
| Comparative Example 2 | Ethylene-propylene random copolymer (PP) | Metal powder 4 | 70:30 | ⊚ | 1.0 mL/g or less |

[1]Weight of thermoplastic resin:weight of metal powder
[2]Amount of oxygen absorbed per unit weight of metal powder contained in oxygen absorbing resin composition (on 30th day from start of test)

As is apparent from Examples 1 to 3, the oxygen absorbing resin compositions of the present invention had a high oxygen absorbing capability even under a relative humidity of 3% RH, that is, under a substantially water-free atmosphere.

Example 4

An Al (aluminum) powder (50% by weight) and an Fe (iron) powder (50% by weight) were mixed together, and the mixture was melted in nitrogen in a high-frequency induction melting furnace to obtain an Al—Fe alloy. The Al—Fe alloy was ground with a jaw crusher, a roll crusher, and a ball mill, and the ground product was classified through a net having an opening of 200 meshes (0.075 mm) to obtain an Al—Fe alloy having a size of not more than 200 meshes. The Al—Fe alloy powder (400 g) thus obtained was mixed with stirring in a 30% (by weight) aqueous sodium hydroxide solution of 55° C. for one hour. The mixed solution was then allowed to stand to remove an supernatant liquid. The precipitate as the residue was washed with distilled water to a pH value of 10 or less to obtain an Al—Fe porous metal powder. The porous metal powder was obtained by a reaction in an aqueous solution from the viewpoint of avoiding contact with oxygen.

The porous metal powder thus obtained was dried in vacuo under conditions of not more than 200 Pa and 100° C. to a water content of not more than 1% by weight to obtain a dried product of an Al—Fe porous metal powder (the dried product of the Al—Fe porous metal powder being referred to as "metal powder 5"). The metal powder 5 thus obtained had a bulk density of 1.3 g/cm³ (as measured according to JIS (Japanese Industrial Standards) Z 2504). The metal powder 5 (1 g) together with a desiccant packaged in an air-permeable small bag was placed in a gas barrier bag (an Al foil-laminated plastic bag). Air (oxygen concentration 20.9% by volume) (650 mL), and the gas barrier bag was sealed and was stored at 25° C. for one day. The relative humidity within the gas barrier bag was measured during the storage with a gas chromatograph and, as a result, was found to be not more than 3% RH.

The concentration of oxygen within the gas barrier bag after the storage at 25° C. for one day was measured with a gas chromatograph and was found to be 9.7% by volume. The amount of oxygen absorbed by the bulk powder was 80.6 mL/g.

The mean particle diameter of the metal powder 5 was measured with a laser diffraction scattering particle size distribution measuring device (SK Laser Micron Sizer LMS-2000e, manufactured by Seishin Enterprise Co. Ltd.) and was found to be 35 μm.

The specific surface area of the metal powder 5 was measured with an automatic specific surface area measuring device (GEMINI VII2390, manufactured by Shimadzu Seisakusho Ltd.) and was found to be 41.0 m²/g. These results are shown in Table 3.

The metal powder 5 and a linear low density polyethylene (available from Japan Polyethylene Corporation, MFR 10.5 g/10 min (measured according to JIS K 7210), hereinafter abbreviated to as "LLDPE2") were melt-kneaded at a weight ratio of LLDPE2:metal powder 5=60:40 with a twin screw extruder to obtain an "oxygen absorbing resin composition A." The oxygen absorbing resin composition A had a density of 1.40 g/cm³. The starting materials were introduced into the twin screw extruder by two types of feeders, a main feeder and a side feeder, the atmosphere of which had been replaced by a nitrogen gas. LLDPE2 was introduced through the main feeder, and the metal powder 5 was introduced into melted LLDPE through the side feeder.

In a film having a two-layer structure by using two kind of resins, an oxygen absorbing layer formed of the oxygen absorbing resin composition A and a thermoplastic resin layer (layer b) formed of LLDPE2 (thickness: oxygen absorbing layer 40 μm/thermoplastic resin layer 20 μm), the surface of the oxygen absorbing layer was subjected to corona discharge treatment in a width of 450 mm at a speed of 30 m/min, and a film roll was prepared. The film roll was free from uneven thickness and had a good appearance. An oxygen absorbing multi-layered film was obtained by providing layers on the corona-treated surface of the film having a two-layer structure by using two kind of resins with a urethane adhesive for dry lamination (manufactured by Toyo Morton Ltd.) to form a film having a layer structure of PET (manufactured by Toyobo Co., Ltd., corona-treated one side, 12)/adhesive (3)/aluminum foil (9)/adhesive (3)/nylon (manufactured by Toyobo Co., Ltd., corona-treated both sides, 15)/adhesive (3)/oxygen absorbing layer (40)/LLDPE2(20). The oxygen absorbing multi-layered film will be referred to as "oxygen absorbing multi-layered film 1." Numerals within the parentheses are thickness (unit: μm) of the individual layers.

A three-side sealed bag having a size of 15 cm×20 cm was prepared using the oxygen absorbing multi-layered film 1. The weight of the oxygen absorbing layer in the prepared three-side sealed bag and the weight of the metal powder 5 contained in the three-side sealed bag were calculated and found to be 3.37 g and 1.35 g, respectively. Air (oxygen concentration 20.9% by volume) (100 mL) together with a desiccant packaged in an air-permeable small bag was filled into the prepared three-side sealed bag, and the bag was sealed and was stored at 25° C. for 30 days. The relative humidity within the stored gas barrier bag was measured during the storage with a gas chromatograph and found to be 3% RH.

The concentration of oxygen within the gas barrier bag stored at 25° C. for 30 days was measured with a gas chromatograph. As a result, the oxygen concentration was not more than 0.1% by volume, and the amount of oxygen absorbed per unit weight of the metal powder 5 contained in the oxygen absorbing multi-layered film 1 was 15.5 mL/g. These results were shown in Table 4.

Example 5

A dried product of an Al—Fe porous metal powder (the dried product of the Al—Fe porous metal powder being referred to as "metal powder 6") was obtained in the same manner as in Example 4, except that the Al—Fe porous metal powder was obtained by performing mixing with stirring in a 30% (by weight) aqueous sodium hydroxide solution of 45° C. for 30 min, then allowing the mixed solution to stand, removing the supernatant liquid, and washing the residual precipitate with distilled water until pH became 10 or less. The metal powder 6 thus obtained had a bulk density of 1.4 g/cm$^3$. The oxygen absorbing capability, the mean particle diameter, and the specific surface area of the metal powder 6 were measured in the same manner as in Example 4. As a result, the concentration of oxygen within the gas barrier bag, the absorption amount of oxygen, the mean particle diameter, and the specific surface area were 15.6% by volume, 40.8 mL/g, 35 μm, and 20.5 m$^2$/g, respectively. These results are shown in Table 3.

The metal powder 6 and a linear low density polyethylene (available from Prime Polymer Co., Ltd., MFR 3.8 g/10 min (measured according to JIS K 7210), hereinafter abbreviated to as "LLDPE3") were melt-kneaded at a ratio of LLDPE3: metal powder 6=70:30 (weight ratio) with a twin screw extruder to obtain an "oxygen absorbing resin composition B." The oxygen absorbing resin composition B had a density of 1.23 g/cm$^3$. The starting materials were introduced into the twin screw extruder by two types of feeders, a main feeder and a side feeder, the atmosphere of which had been replaced by a nitrogen gas. LLDPE3 was introduced through the main feeder, and the metal powder 6 was introduced into melted LLDPE3 through the side feeder.

A film having a three-layer structure (thickness: 20 μm/30 μm/20 μm) by using two kind of resins, that is, a core layer formed of the oxygen absorbing resin composition B and skin layers formed of LLDPE3, was prepared in a width of 600 mm at a speed of 70 m/min. The film thus obtained had a good appearance.

The film having a three-layer structure by using two kind of resins were cut into a size of 15 cm×15 cm. Two sheets of the film having the three-layer structure by using two kind of resins, together with a desiccant packaged in an air-permeable bag, were placed in a gas barrier bag (an Al foil laminated plastic bag). Air (oxygen concentration 20.9% by volume) (200 mL) was filled into the bag, and the bag was sealed and was stored at 25° C. for 30 days. The weight of the oxygen absorbing layer in the cut film and the weight of the metal powder 6 contained in the film were calculated and found to be 1.66 g and 0.50 g, respectively. The relative humidity within the stored gas barrier bag was measured during the storage with a gas chromatograph and found to be not more than 3% RH.

The concentration of oxygen within the gas barrier bag stored at 25° C. for 30 days was measured with a gas chromatograph. As a result, the oxygen concentration was 16.0% by volume, and the amount of oxygen absorbed per unit weight of the metal powder 6 contained in the film having the three-layer structure by using two kind of resins was 23.5 mL/g. These results are shown in Table 4.

Example 6

A dried product of an Al—Ni porous metal powder (the dried product of an Al—Ni porous metal powder being hereinafter referred to as "metal powder 7") was obtained in the same manner as in Example 4, except that Ni (nickel) was used instead of Fe (iron). The metal powder 7 thus obtained had a bulk density of 1.2 g/cm$^3$. The oxygen absorbing capability, the mean particle diameter, and the specific surface area of the metal powder 7 were measured in the same manner as in Example 4. As a result, the concentration of oxygen within the gas barrier bag, the absorption amount of oxygen, the mean particle diameter, and the specific surface area were 10.1% by volume, 78.1 mL/g, 21 μm, and 85.0 m$^2$/g, respectively. These results are shown in Table 3.

A film having a three-layer structure by using two kind of resins was prepared in the same manner as in Example 5, except that the metal powder 7 and LLDPE3 were melt-kneaded at a ratio of LLDPE3:metal powder 7=70:30 (weight ratio) with a twin screw extruder to obtain an "oxygen absorbing resin composition C" which was then used as the core layer. The oxygen absorbing resin composition C had a density of 1.24 g/cm³. The film thus obtained had a good appearance. The weight of the oxygen absorbing layer in the cut film and the weight of the metal powder 7 contained in the film were calculated in the same manner as in Example 5 and found to be 1.68 g and 0.50 g, respectively. After storage at 25° C. for 30 days, the oxygen absorbing capability of the film having the three-layer structure by using two kind of resins was measured. As a result, the concentration of oxygen within the gas barrier bag stored at 25° C. for 30 days was 12.6% by volume, and the amount of oxygen absorbed per unit weight of the metal powder 7 contained in the film having the three-layer structure by using two kind of resins was 37.8 mL/g. These results are shown in Table 4.

Example 7

A film having the three-layer structure by using two kind of resins was prepared in the same manner as in Example 5, except that the metal powder 7 and LLDPE3 were melt-kneaded at a ratio of LLDPE3:metal powder 7=30:70 (weight ratio) with a twin screw extruder to obtain an "oxygen absorbing resin composition D" which was used as the core layer. The oxygen absorbing resin composition D had a density of 2.41 g/cm³. Although the appearance of the film was substantially good, the film was fragile and had some holes. The weight of the oxygen absorbing layer in the cut film and the weight of the metal powder 7 contained in the film were calculated in the same manner as in Example 6 and found to be 3.26 g and 2.28 g, respectively. After storage at 25° C. for 30 days, the oxygen absorbing capability of the film having the three-layer structure by using two kind of resins was measured. As a result, the concentration of oxygen within the gas barrier bag stored at 25° C. for 30 days was not more than 0.1% by volume, and the amount of oxygen absorbed per unit weight of the metal powder 7 contained in the film having the three-layer structure by using two kind of resins was 18.2 mL/g. These results are shown in Table 4.

Comparative Example 3

An iron powder (100 kg) having a mean particle diameter of 50 μm was introduced into a closed ribbon mixer with a heating jacket. A 40% (by weight) aqueous calcium chloride solution (35 kg) was sprayed on the iron powder while mixing the iron powder at 160° C. under a reduced pressure of 10 mmHg, followed by drying. The dried product was sieved to remove coarse particles to obtain an iron-based oxygen absorbing agent having a mean particle diameter of 50 μm (hereinafter referred to as "metal powder 8"). The metal powder 8 thus obtained had a bulk density of 2.8 g/cm³. The oxygen absorbing capability and the specific surface area of the metal powder 8 were measured in the same manner as in Example 4, except that, in the measurement of the oxygen absorbing capability, 3 g of the metal powder 8, together with a desiccant packaged in an air-permeable small bag, was placed in the gas barrier bag. As a result, the concentration of oxygen within the gas barrier bag, the amount of oxygen absorbed, and the specific surface area were 20.1% by volume, 2.2 mL/g, and 0.1 m²/g, respectively. These results are shown in Table 3.

A film having the three-layer structure by using two kind of resins was prepared in the same manner as in Example 5, except that the metal powder 8 and LLDPE3 were melt-kneaded at a ratio of LLDPE3:metal powder 8=70:30 (weight ratio) with a twin screw extruder to obtain an "oxygen absorbing resin composition E" which was used as the core layer. The oxygen absorbing resin composition E had a density of 1.24 g/cm³. The film thus obtained had a good appearance. The weight of the oxygen absorbing layer in the cut film and the weight of the metal powder 8 contained in the film were calculated in the same manner as in Example 5 and found to be 1.67 g and 0.5 g, respectively. After storage at 25° C. for 30 days, the oxygen absorbing capability of the film having the three-layer structure by using two kind of resins was measured. As a result, the concentration of oxygen within the gas barrier bag stored at 25° C. for 30 days was 20.7% by volume, and the amount of oxygen absorbed per unit weight of the metal powder 8 contained in the film having the three-layer structure by using two kind of resins was 1.0 mL/g. These results are shown in Table 4.

Comparative Example 4

The oxygen absorbing capability and the specific surface area of the metal powder 9 were measured in the same manner as in Comparative Example 3, except that a Ni powder (manufactured by Toho Titanium Co., Ltd., bulk density 4.0 g/cm³, hereinafter referred to as "metal powder 9") was used instead of the metal powder 8. As a result, the concentration of oxygen within the gas barrier bag, the amount of oxygen absorbed, and the specific surface area were 20.7% by volume, not more than 1.0 mL/g, and 2.4 m²/g, respectively. These results are shown in Table 3.

A film having a three-layer structure by using two kind of resins was prepared in the same manner as in Example 5, except that the metal powder 9 and LLDPE3 were melt-kneaded at a ratio of LLDPE3:metal powder 9=70:30 (weight ratio) with a twin screw extruder to obtain an "oxygen absorbing resin composition F" which was then used as the core layer. The oxygen absorbing resin composition F had a density of 1.25 g/cm³. The film thus obtained had a good appearance. The weight of the oxygen absorbing layer in the cut film and the weight of the metal powder 9 contained in the film were calculated in the same manner as in Example 5 and found to be 1.68 g and 0.50 g, respectively. After storage at 25° C. for 30 days, the oxygen absorbing capability of the film having the three-layer structure by using two kind of resins was measured. As a result, the concentration of oxygen within the gas barrier bag stored at 25° C. for 30 days was 20.8% by volume, and the amount of oxygen absorbed per unit weight of the metal powder 9 contained in the film having the three-layer structure by using two kind of resins was not more than 1.0 mL/g. These results are shown in Table 4.

TABLE 3

|  | Composition of metal powder[1] | Mean particle diameter (μm) | Specific surface area by BET method (m²/g) | Bulk Density (g/cm³) | Amount of oxygen absorbed (mL/g) |
|---|---|---|---|---|---|
| Metal powder 5[2] | Fe (93) Al (7) | 35 | 41.0 | 1.3 | 80.6 |
| Metal powder 6[2] | Fe (73) Al (27) | 35 | 20.5 | 1.4 | 40.8 |
| Metal powder 7[2] | Ni (90) Al (10) | 21 | 85.0 | 1.2 | 78.1 |
| Metal powder 8 | Fe (100) | 50 | 0.1 | 2.8 | 2.2 |
| Metal powder 9 | Ni (100) | 0.3 | 2.4 | 4.0 | Not more than 1.0 |

[1]Numerals within the parentheses indicate % by weight of individual components
[2]Porous metal powder obtained by eluting and removing a part of Al.

TABLE 4

| | Oxygen absorbing resin composition | | | | In-bag | Amount of oxygen absorbed in resin |
|---|---|---|---|---|---|---|
| | Thermoplastic resin | Metal powder | Composition[1] | Film Appearance | oxygen concentration[2] | composition (per unit weight of metal powder)[3] |
| Example 4[4] | Linear low-density polyethylene (LLDPE) | Metal powder 5 | 60:40 | Good | Not more than 0.1% | 15.5 mL/g |
| Example 5[5] | Linear low-density polyethylene (LLDPE2) | Metal Powder 6 | 70:30 | Good | 16.0% | 23.5 mL/g |
| Example 6[5] | Linear low-density polyethylene (LLDPE2) | Metal Powder 7 | 70:30 | Good | 12.6% | 37.8 mL/g |
| Example 7[5] | Linear low-density polyethylene (LLDPE2) | Metal Powder 7 | 30:70 | Nearly good | Not more than 0.1% | 18.2 mL/g |
| Comparative Example 3[5] | Linear low-density polyethylene (LLDPE2) | Metal Powder 8 | 70:30 | Good | 20.7% | 1.0 mL/g |
| Comparative Example 4[5] | Linear low-density polyethylene (LLDPE2) | Metal Powder 9 | 70:30 | Good | 20.8% | Not more than 1.0 mL/g |

[1] Weight of thermoplastic resin:weight of metal powder
[2] Concentration of oxygen within bag on 30th day from start of the test (% by volume)
[3] Amount of oxygen absorbed per unit weight of metal powder contained in oxygen absorbing multi-layered body (on 30th day from start of the test)
[4] Oxygen absorbing capability: measured after sealing 100 mL of air into three-side sealed bag having a size of 15 cm × 20 cm formed by fabricating the oxygen absorbing multi-layered film 1
[5] Oxygen absorbing capability: measured after sealing 2 sheets of the film having a three-layer structure by using two kind of resins and a size of 15 cm × 15 cm together with 200 mL of air into gas barrier bag As is apparent from Examples 4 to 7, the oxygen absorbing multilayered bodies according to the present invention exhibit an oxygen absorbing capability even under a substantially water-free atmosphere of a low humidity of not more than 30% RH (25° C.) and can realize storage with deoxygenation of objects even under a low humidity.

Example 8

An Al (aluminum) powder (50% by weight) and an Fe (iron) powder (50% by weight) were mixed together and were dissolved in each other in nitrogen to obtain an Al—Fe alloy. The Al—Fe alloy thus obtained was ground with a jaw crusher, a roll crusher, and a ball mill, and the ground product was classified with a net having an opening of 200 meshes (0.075 mm) to obtain an Al—Fe alloy having a particle size of not more than 200 meshes. The Al—Fe alloy powder (150 g) thus obtained was mixed while stirring for one hour in a 30% (by weight) aqueous sodium hydroxide solution of 50° C. The mixed solution was allowed to stand, and the supernatant liquid was removed. The residual precipitate was washed with distilled water until pH became 10 or less to obtain a porous Al—Fe metal powder. In order to avoid contact with oxygen, the porous metal powder was obtained by a reaction in an aqueous solution.

The porous metal powder thus obtained was dried in vacuo under conditions of not more than 200 Pa and 80° C. to a water content of not more than 1% by weight to obtain a dried product of a porous Al—Fe metal powder (the dried product of the porous Al—Fe metal powder being hereinafter referred to as "metal powder 10"). The metal powder 10 had a bulk density of 1.3 g/cm³ (as measured according to JIS Z 2504). The metal powder 10 (1 g) was packaged in an air-permeable small bag and, together with a desiccant, was placed in a gas barrier bag (an Al foil-laminated plastic bag). The gas barrier bag was filled with 500 mL of air (oxygen concentration: 20.9% by volume), was hermetically sealed, and was stored at 25° C. for one day.

The concentration of oxygen within the gas barrier bag after the storage at 25° C. for one day was measured by gas chromatograph and was found to be 4.1% by volume. The amount of oxygen absorbed was calculated from the reduced oxygen concentration within the gas barrier bag and was found to be 87.6 mL/g.

The average particle diameter of the metal powder 10 was measured with a laser diffraction scattering particle size distribution measuring device (SK Laser Micron Sizer LMS-2000e, manufactured by Seishin Enterprise Co. Ltd.) and was found to be 31 μm.

The specific surface area of the metal powder 10 was measured with an automatic specific surface area measuring device ("GEMINI VI12390," manufactured by Shimadzu Seisakusho Ltd.) and was found to be 37.0 m²/g. The results were shown in Table 5.

The metal powder 10 and a high density polyethylene (manufactured by Ube Maruzen Polyethylene Co, Ltd., tradename: "UBE Polyethylene "B300H," MFR 1.0 g/10 min (as measured according to JIS K 7210), hereinafter abbreviated to as "HDPE1") were melt-kneaded at a weight ratio of HDPE1:metal powder 10=60:40 (weight ratio) with a twin screw extruder having two types of feeders, a main feeder and a side feeder, the atmosphere of which had been replaced by a nitrogen gas, and the kneaded product was extruded into a strand. The strand was cut with a pelletizer to obtain an "oxygen absorbing resin composition pellet C." HDPE1 was introduced through the main feeder, and the metal powder 10 was introduced into melted HDPE1 through the side feeder. The oxygen absorbing resin composition pellet C had a density of about 1.5 g/cm³ and a MFR of 0.4 g/10 min (as measured according to JIS K 7210).

An oxygen absorbing hollow container was then obtained as follows. A container that has an inner volume of 100 mL and has a six-layer structure by using four kind of resins was prepared with a direct blow molding machine using the oxygen absorbing resin composition pellet C for an oxygen absorbing layer (layer a), HDPE1 for a thermoplastic resin layer (layer b), an ethylene-vinyl alcohol copolymer resin (manufactured by Nippon Synthetic Chemical Industry Co., Ltd., tradename: SoarnoL "DC3203RB") as resin for a gas barrier layer (layer c), and a carboxylic acid-modified polyolefin resin (manufactured by Mitsubishi Chemical Corporation, tradename: Zelas "MC721AP") as a resin for an adhesive resin layer (d). The oxygen absorbing hollow container had a dimension of 83.5 mm in height, 48 mm in outer diameter of the container bottom, and 25.2 mm in inner diameter of the mouth portion. The surface area of the innermost layer was 0.013 m². In the manufacture of the container, the molding was carried out at 200° C. The oxygen absorbing hollow container had a layer construction of thermoplastic resin layer (layer b)/adhesive resin layer (layer d)/barrier layer (layer b)/adhesive resin layer (layer d)/oxygen absorbing layer (layer a)/thermoplastic resin layer (layer c) as viewed from the outer surface toward the inner surface, and the thicknesses of the individual layers were 600 μm/100 μm/100 μm/100 μm/200 μm/100 μm as viewed from the outer surface toward the inner surface. The hollow container was incinerated, and the amount of the metal of (I) contained was measured and found to be 1.5 g.

Figure 10:
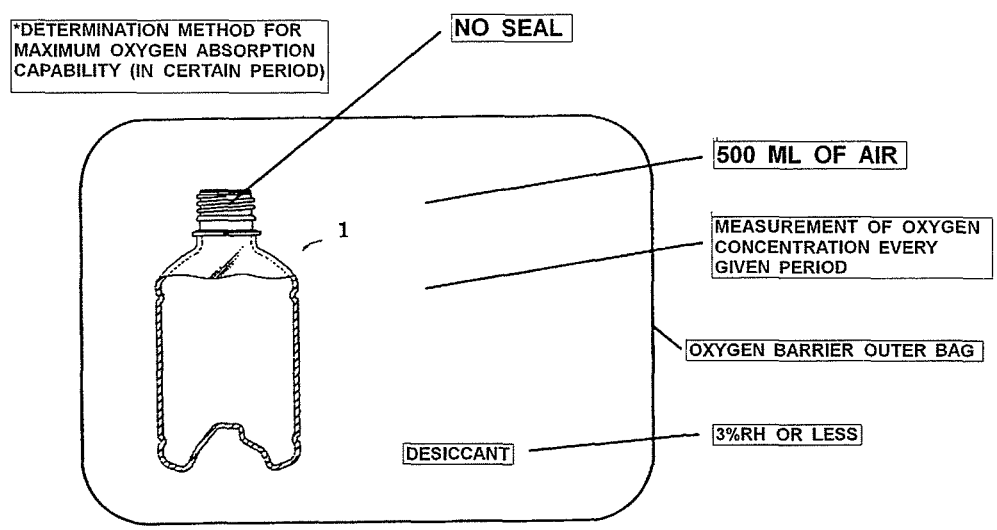
FIG. 10 is a schematic view of a testing apparatus for measuring the amount of oxygen absorbed by an oxygen absorbing hollow container according to the present invention.

The amount of oxygen absorbed in the oxygen absorbing hollow container was evaluated. As shown in FIG. 10, the hollow container together with a desiccant was placed in a gas barrier bag (an Al foil laminated plastic bag), and 500 mL of air (oxygen concentration 20.9% by volume) was regulated to allow the air to be filled into a gas barrier bag, followed by hermetical sealing. The gas barrier bag was stored at 25° C. for 60 days. The relative humidity within the gas barrier bag was measured with a gas chromatograph during the storage and found to be not more than 3% RH.

The concentration of oxygen within the gas barrier bag stored at 25° C. for 60 days was measured with a gas chromatograph. As a result, the concentration of oxygen within the gas barrier bag was 10.0% by volume. The amount of oxygen absorbed when calculated from a reduced oxygen concentration within the gas barrier bag was 40.2 mL/g per unit weight of the metal powder 10 contained in the oxygen absorbing hollow container. The amount of oxygen absorbed by the oxygen absorbing hollow container at 25° C. for 60 days was 60.3 mL. These results are shown in Table 6. The above results show an oxygen absorbing capability is high enough to absorb oxygen (20.9 mL) within a container (inner volume 100 mL).

Comparative Example 5

A reduced iron powder (200 kg) having a mean particle diameter of 35 μm was introduced into a closed ribbon mixer with a heating jacket. A 45% (by weight) aqueous calcium chloride solution (70 kg) was sprayed on the iron powder while mixing the iron powder at 150° C. under a reduced pressure of 1.5 kPa, followed by drying. The dried product was sieved to remove coarse particles to obtain a reducing iron-based oxygen absorbing agent having a mean particle diameter of 35 μm (hereinafter referred to as "metal powder 11"). The metal powder 11 thus obtained had a bulk density of 2.7 g/cm³. The oxygen absorbing capability and the specific surface area of the metal powder 11 were measured in the same manner as in Example 8. As a result, the concentration of oxygen within the gas barrier bag, the amount of oxygen absorbed, and the specific surface area were 20.5% by volume, 2.5 mL/g, and 0.1 m²/g, respectively. These results are shown in Table 5.

A hollow container was prepared in the same manner as in Example 8, except that the metal powder 11 was used. In the same manner as in Example 8, the hollow container together with a desiccant was placed in a barrier bag (Al foil laminated plastic bag), and the barrier bag was stored at 25° C. for 60 days. The concentration of oxygen within the gas barrier bag after the storage at 25° C. for 60 days was measured with a gas chromatograph and was found to be 20.7% by volume. The amount of oxygen absorbed when calculated from a reduced oxygen concentration within the gas barrier bag was 1.4 mL/g per unit weight of the metal powder 11 contained in the oxygen absorbing hollow container. The amount of oxygen absorbed by the hollow container in a period of 60 days at 25° C. was 2.1 mL. These results are shown in Table 6. This amount is only 10% of oxygen (20.9 mL) contained in the container, demonstrating that the oxygen absorbing capability is unsatisfactory.

TABLE 5

| | Composition of metal powder[1] | Mean particle diameter (μm) | Specific surface area by BET method (m²/g) | Bulk Density (g/cm³) | Amount of oxygen absorbed (mL/g) |
|---|---|---|---|---|---|
| Metal powder 10[2] | Fe (93) Al (7) | 31 | 37.0 | 1.3 | 87.6 |
| Metal powder 11 | Fe (100) | 35 | 0.1 | 2.7 | 2.5 |

[1]Numerals within the parentheses indicate % by weight of individual components
[2]Metal powder 1 is porous metal powder obtained by eluting and removing a part of Al.

TABLE 6

| | Oxygen absorbing resin composition | | | In-bag oxygen concentration[2] | Amount of oxygen absorbed in resin composition (per unit weight of metal powder)[3] |
|---|---|---|---|---|---|
| | Thermoplastic resin | Metal powder | Composition[1] | | |
| Example 8[4] | High-density polyethylene (HDPE1) | Metal Powder 10 | 60:40 | 10.0% | 40.2 mL/g |
| Comparative Example 5[4] | High-density polyethylene (HDPE1) | Metal Powder 11 | 60:40 | 20.7% | 1.4 mL/g |

[1]Weight of thermoplastic resin:weight of metal powder
[2]Concentration of oxygen within bag on 60th day from start of the test (% by volume)
[3]Amount of oxygen absorbed per unit weight of metal powder contained in oxygen absorbing hollow container (on 60th day from start of the test)
[4]Oxygen absorbing capability: measured after sealing 500 mL of air into barrier bag into which the oxygen absorbing hollow container together with the desiccant had been placed Example 9

The metal powder 10 and a high density polyethylene (manufactured by Ube Maruzen Polyethylene Co, Ltd., tradename; UBE Polyethylene "B120H," MFR 1.0 g/10 min (as measured according to JIS K 7210), hereinafter abbreviated to as "HDPE2") were melt-kneaded at a weight ratio of HDPE2:metal powder 10=60:40 (weight ratio) with a twin screw extruder having two types of feeders, a main feeder and a side feeder, the atmosphere of which had been replaced by a nitrogen gas, and the kneaded product was extruded into a strand. The strand was cut with a pelletizer to obtain an "oxygen absorbing resin composition pellet D." HDPE2 was introduced through the main feeder, and the metal powder 10 was introduced into melted HDPE2 through the side feeder. The oxygen absorbing resin composition pellet D had a density of about 1.5 g/cm$^3$ and a MFR of 0.4 g/10 min (as measured according to JIS K 7210).

Next, the following light shielding oxygen absorbing hollow container having a six-layer structure by using four kind of resins was prepared. The hollow container had a layer construction of outer layer of thermoplastic resin (layer b1)/adhesive resin layer (layer d)/gas barrier layer (layer c)/adhesive resin layer (layer d)/light shielding oxygen absorbing layer (layer a)/inner layer of thermoplastic resin (layer b2) as viewed from the outer surface toward the inner surface, and the thicknesses (μm) of the individual layers were 600/100/100/100/100/200/100.

A resin obtained by adding 10 parts by weight of a white master batch (manufactured by TOKYO PRINTING INK MFG. CO., LTD., tradename PEX 6860 White; LDPE/titanium oxide=40 parts by weight/60 parts by weight) to 90 parts by weight of HDPE2 was used as the resin for the outer layer of thermoplastic resin (layer b1). A carboxylic acid-modified polyolefin resin (manufactured by Mitsubishi Chemical Corporation, tradename: Zelas "MC735") was used as the resin for the adhesive resin layer (layer d). An ethylene-vinyl alcohol copolymer resin(manufactured by Nippon Synthetic Chemical Industry Co., Ltd., tradename: SoarnoL "DT2904") was used as the resin for the gas barrier layer (layer c). A resin obtained by adding 5 parts by weight of a black master batch (manufactured by TOKYO PRINTING INK MFG. CO., LTD., tradename PEX 3286 3S Black; LDPE/carbon black=70 parts by weight/30 parts by weight) to 95 parts by weight of the oxygen absorbing resin composition pellet D was used as the resin for the light shielding oxygen absorbing layer (layer a). HDPE2 was used as the resin for the inner layer of the thermoplastic resin (layer b2).

A container having a capacity of 100 mL was manufactured by molding at a temperature of 200° C. with a direct blow molding machine using these materials. The container had a dimension of 83.5 mm in height, 48 mm in outer diameter of the container bottom, 25.2 mm in inner diameter of the mouth portion, and 0.013 m$^2$ in surface area of the innermost layer. The light shielding oxygen absorbing hollow container was incinerated, and the amount of the metal powder 10 contained was measured and found to be 1.5 g.

The amount of oxygen absorbed by the oxygen absorbing hollow container thus obtained was evaluated. As shown in FIG. 10, the hollow container together with a desiccant was placed in a gas barrier bag (an Al foil laminated plastic bag), and air (oxygen concentration 20.9% by volume) was regulated to allow 500 mL of the air to be filled into a gas barrier bag, followed by hermetical sealing. The gas barrier bag was stored at 25° C. for 60 days. The relative humidity within the gas barrier bag was measured with a gas chromatograph during the storage and found to be not more than 3% RH.

The concentration of oxygen within the gas barrier bag after the storage at 25° C. for 60 days was measured with a gas chromatograph. As a result, the concentration of oxygen within the gas barrier bag was 10.0% by volume. The amount of oxygen absorbed when calculated from a reduced oxygen concentration within the gas barrier bag was 40.2 mL/g per unit weight of the metal powder 10 contained in the oxygen absorbing hollow container. The amount of oxygen absorbed by the oxygen absorbing hollow container in a period of 60 days at 25° C. was 60.3 mL. The above results demonstrate that the oxygen absorbing capability is high enough to absorb oxygen (20.9 mL) within the container (inner volume 100 mL).

The light transmittance of the light shielding oxygen absorbing hollow container at a wavelength range of 200 to 800 nm was measured with an ultraviolet-visible spectrophotometer ("U-3500," manufactured by Hitachi, Ltd.) to evaluate the light shielding capability of the container. As a result, this hollow container had an ultraviolet-visible light transmittance of not more than 0.1%, that is, had a satisfactory light shielding capability. Further, by virtue of the addition of the white pigment to the outermost layer, the hollow container had a good white appearance.

DESCRIPTION OF REFERENCE CHARACTERS 2 oxygen absorbing multilayered body
3 oxygen absorbing layer (layer a)
4 thermoplastic resin layer (layer b)
5 oxygen absorbing multilayered body
6 oxygen absorbing layer (layer a)
7 thermoplastic resin layer (layer b)
8 gas barrier layer (layer c)
1 oxygen absorbing hollow container
10 oxygen absorbing hollow container
11 oxygen absorbing layer (layer a)
20 oxygen absorbing hollow container
21 oxygen absorbing layer (layer a)
22 thermoplastic resin layer (layer b)
30 oxygen absorbing hollow container
31 oxygen absorbing layer (layer a)
32 thermoplastic resin layer (layer b)
40 oxygen absorbing hollow container
41 oxygen absorbing layer (layer a)
42 thermoplastic resin layer (layer b)
43 gas barrier layer (layer c)
50 oxygen absorbing hollow container
51 oxygen absorbing layer (layer a)
52 thermoplastic resin layer (layer b)
53 gas barrier layer (layer c)
54 adhesive layer (layer d)
60 oxygen absorbing hollow container
61 oxygen absorbing layer (layer a)
62 thermoplastic resin layer (layer b)
63 gas barrier layer (layer c)
64 adhesive layer (layer d)
65 recycle layer

The invention claimed is:
1. An oxygen absorbing resin composition comprising:
(I) an oxygen absorbing agent consisting of a metal of (I) obtained by subjecting an alloy comprising
  (A) at least one transition metal selected from the group consisting of manganese, iron, platinum, and copper group metals and
  (B) at least one metal selected from the group consisting of aluminum, zinc, tin, lead, magnesium, and silicon to treatment with an acidic or alkaline aqueous solution to elute and remove at least a part of the component (B); and
(II) a thermoplastic resin,
wherein the specific surface area, as measured by a BET method, of the metal of (I) is at least 10 m$^2$/g, and the mean particle diameter of the metal of (I) is 1 to 1,000 μm.

2. The oxygen absorbing resin composition according to claim 1, which can absorb oxygen even in an atmosphere having a low humidity of 30% RH or less at 25° C.

3. The oxygen absorbing resin composition according to claim 1, which has a capability of absorbing at least 5 mL of oxygen per g in an atmosphere having a low humidity of 30% RH or less at 25° C.

4. The oxygen absorbing resin composition according to claim 1, wherein the metal of (I) is porous.

5. The oxygen absorbing resin composition according to claim 1, wherein the component (A) is at least one transition metal selected from the group consisting of iron, cobalt, nickel, and copper.

6. The oxygen absorbing resin composition according to claim 1, wherein the component (B) is aluminum.

7. The oxygen absorbing resin composition according to claim 1, wherein the content of the component (B) in the metal of (I) is 0.1 to 50% by weight.

8. The oxygen absorbing resin composition according to claim 1, wherein the alloy is powdery and the metal of (I) is powdery.

9. The oxygen absorbing resin composition according to claim 1, wherein an aqueous sodium hydroxide solution is used in the treatment with the aqueous solution.

10. The oxygen absorbing resin composition according to claim 1, wherein the thermoplastic resin of (II) is at least one resin selected from the group consisting of polyolefin resins, polyester resins, polyamide resins, polyvinyl alcohol resins, ethylene-vinyl alcohol copolymers, and chlorine-based resins.

11. An oxygen absorbing packaging body comprising: an oxygen absorbing resin composition according to claim 1; and a packaging material, the whole or a part of which is formed of an air-permeable packaging material, the oxygen absorbing resin composition having been packaged into the packaging material.

12. An oxygen absorbing multilayered body comprising:
an oxygen absorbing layer (layer a) formed of an oxygen absorbing resin composition according to claim 1; and
a thermoplastic resin layer (layer b) formed of a thermoplastic resin-containing thermoplastic resin composition, the thermoplastic resin layer (layer b) being provided on one side or both sides of the oxygen absorbing layer (layer a).

13. The oxygen absorbing multilayered body according to claim 12, which further comprises a gas barrier layer (layer c).

14. The oxygen absorbing multilayered body according to claim 12, which further comprises an adhesive layer (d) provided between the oxygen absorbing layer (layer a) and the thermoplastic resin layer (layer b).

15. The oxygen absorbing multilayered body according to claim 13, which further comprises an adhesive layer (d) between the oxygen absorbing layer (layer a) and the gas barrier layer (layer c) and/or between the thermoplastic resin layer (layer b) and the gas barrier layer (layer c).

16. The oxygen absorbing multilayered body according to claim 12, wherein the thermoplastic resin used in the thermoplastic resin layer (layer b) is at least one resin selected from the group consisting of polyolefin resins, polyester resins, polyamide resins, polyvinyl alcohol resins, ethylene-vinyl alcohol copolymer resins, and chlorine-based resins.

17. The oxygen absorbing multilayered body according to claim 12, wherein the oxygen absorbing multilayered body is at least one member selected from the group consisting of pellets, films, sheets, trays, cups, PTP containers, bottles, tubes, blocks, and caps.

18. A preform for an oxygen absorbing package container, the preform comprising an oxygen absorbing multilayered body according to claim 12.

19. An oxygen absorbing package container comprising: a package container; and an oxygen absorbing multilayered body according to claim 12 that is used in at least a part of the package container.

20. An oxygen absorbing hollow container comprising an oxygen absorbing layer (layer a) formed of an oxygen absorbing resin composition according to claim 1.

21. The oxygen absorbing hollow container according to claim 20, wherein at least one layer in the oxygen absorbing hollow container further comprises a light shielding material.

22. The oxygen absorbing hollow container according to claim 21, wherein the light shielding material contains at least one material selected from the group consisting of carbon black, titanium black, and titanium oxide.

23. The oxygen absorbing hollow container according to claim 20, wherein at least one of the innermost layer and the outermost layer in the oxygen absorbing hollow container is a thermoplastic resin layer (layer b) formed of a thermoplastic resin-containing thermoplastic resin composition.

24. The oxygen absorbing hollow container according to claim 20, which further comprises a gas barrier layer (layer c).

25. The oxygen absorbing hollow container according to claim 24, wherein the thermoplastic resin layer (layer b), the gas barrier layer (layer c), the oxygen absorbing layer (layer a), and the thermoplastic resin layer (layer b) are provided in that order as viewed from the outer surface toward the inner surface.

26. The oxygen absorbing hollow container according to claim 20, which further comprises an adhesive layer (layer d).

27. The oxygen absorbing hollow container according to claim 26, wherein the thermoplastic resin layer (layer b), the adhesive layer (layer d), the gas barrier layer (layer c), the adhesive layer (layer d), the oxygen absorbing layer (layer a), and the thermoplastic resin layer (layer b) are provided in that order as viewed from the outer surface toward the inner surface.

28. The oxygen absorbing hollow container according to claim 23, wherein the thermoplastic resin layer (layer b) provided on an outer side of the oxygen absorbing layer (layer a) contains a white pigment.

29. The oxygen absorbing hollow container according to claim 23, wherein the thermoplastic resin used in the thermoplastic resin layer (layer b) is at least one resin selected from the group consisting of polyolefin resins, polyester resins, polyamide resins, polyvinyl alcohol resins, ethylene-vinyl alcohol copolymer resins, and chlorine-based resins.

30. The oxygen absorbing hollow container according to claim 20, wherein the innermost layer in the oxygen absorbing hollow container has a thickness of not more than 200 μm.

31. The oxygen absorbing hollow container according to claim 20, wherein at least one layer in the oxygen absorbing hollow container contains a desiccant.

32. A method for storing an object, the method comprising placing the object in an oxygen absorbing multilayered body according to claim 12.

* * * * *